(12) United States Patent
Moon et al.

(10) Patent No.: US 11,349,871 B2
(45) Date of Patent: May 31, 2022

(54) DYNAMIC AND CRYPTOGRAPHICALLY SECURE AUGMENTATION OF PROGRAMMATICALLY ESTABLISHED CHATBOT SESSIONS

(71) Applicant: The Toronto-Dominion Bank, Toronto (CA)

(72) Inventors: Tae Gyun Moon, Toronto (CA); Robert Alexander Mccarter, Eden (CA); Kheiver Kayode Roberts, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 500 days.

(21) Appl. No.: 16/256,250

(22) Filed: Jan. 24, 2019

(65) Prior Publication Data

US 2020/0244700 A1    Jul. 30, 2020

(51) Int. Cl.
*H04L 29/06*        (2006.01)
*H04L 9/40*         (2022.01)
*G06F 21/60*        (2013.01)
*G06F 40/40*        (2020.01)

(52) U.S. Cl.
CPC ............ *H04L 63/18* (2013.01); *G06F 21/602* (2013.01); *H04L 63/08* (2013.01); *G06F 40/40* (2020.01)

(58) Field of Classification Search
CPC ..... H04L 63/18; H04L 63/08; H04L 63/0807; H04L 63/0823; H04L 63/0876; H04L 9/3215; H04L 9/0827; H04L 9/321; H04L 9/3213; H04W 12/105; H04W 12/32; G06F 40/40; G06F 21/62; G06F 21/31; G06F 21/44; G06F 21/42
See application file for complete search history.

(56) References Cited

U.S. PATENT DOCUMENTS

| | | | |
|---|---|---|---|
| 2010/0138905 A1* | 6/2010 | Kass | G06F 21/33 726/7 |
| 2013/0054740 A1* | 2/2013 | Klein | H04L 65/1069 709/217 |
| 2015/0039737 A1* | 2/2015 | Smith | H04L 41/0806 709/222 |
| 2016/0373542 A1* | 12/2016 | Baba | H04L 67/2838 |
| 2017/0093837 A1* | 3/2017 | Watanabe | G06F 16/176 |
| 2019/0236205 A1* | 8/2019 | Jia | G06N 5/02 |

(Continued)

*Primary Examiner* — Shaqueal D Wade-Wright
(74) *Attorney, Agent, or Firm* — Duane Morris LLP

(57) ABSTRACT

The disclosed exemplary embodiments include computer-implemented systems, apparatuses, and processes that dynamically and securely augment a programmatically established communications session, such as a chatbot session, to include one or more additional responsive applications. For example, an apparatus may receive messaging data during a first communication session programmatically established between a device and a first executed application program, and may determine that an additional apparatus is configured to perform operations consistent with the messaging data. The apparatus may transmit a digital token and at least a portion of the messaging data to an additional apparatus. A second application executed by the additional apparatus may validate the digital token and based on the portion of the messaging data, establish a second communication session between the device and the executed first and second application programs.

21 Claims, 8 Drawing Sheets

(56) References Cited

U.S. PATENT DOCUMENTS

2019/0297147 A1* 9/2019 Drasin .................. H04L 67/148
2019/0391858 A1* 12/2019 Studnicka ............ G06Q 20/326
2020/0160350 A1* 5/2020 Sugimoto ............. H04L 9/0643

* cited by examiner

DYNAMIC AND CRYPTOGRAPHICALLY SECURE AUGMENTATION OF PROGRAMMATICALLY ESTABLISHED CHATBOT SESSIONS

TECHNICAL FIELD

The disclosed embodiments generally relate to computer-implemented systems and processes that dynamically and securely augment programmatically established chatbot sessions

BACKGROUND

Many institutions, online retailers, and other business use chatbots to increase and improve a level of user engagement within corresponding digital platforms, such as, but not limited to, websites, messaging applications, and mobile applications. These existing chatbots may receive a message from a user's device (e.g., provided as input to a corresponding chat interface), programmatically generate responses to these received messages, and generate and transmit, to the user's device, a response to the received message for presentation within a corresponding digital interface.

SUMMARY

In some examples, an apparatus includes a communications unit, a memory storing instructions, and at least one processor coupled to the communications unit and to the memory. The at least one processor is configured to execute the instructions to receive, via the communications unit, a first signal from a device that includes messaging data. The first signal may be received during a first communication session established between the device and a first executed application program. The at least one processor may be further configured to execute the instructions to determine that an additional apparatus is configured to perform operations consistent with the messaging data, and generate and transmit, via the communications unit, a second signal to the additional apparatus that includes a digital token and at least a portion of the messaging data. The second signal may include information that causes a second application program executed by the additional apparatus to validate the digital token, and establish a second communication session between the device and the executed first and second application programs based on the portion of the messaging data.

In other examples, a computer-implemented method includes receiving, using at least one processor, a first signal from a device that includes messaging data. The first signal may be received during a communication session established between the device and a first executed application program. The computer-implemented method also includes determining, using the at least one processor, that an additional apparatus is configured to perform operations consistent with the messaging data and using the at least one processor, generating and transmitting a second signal to the additional apparatus that includes a digital token and at least a portion of the messaging data. The second signal may include information that causes a second application program executed by the additional apparatus to validate the digital token and establish a second communication session between the device and the executed first and second application programs based on the portion of the messaging data.

Further, in some examples, an apparatus includes a communications unit, a memory storing instructions, and at least one processor coupled to the communications unit and to the memory. The at least one processor is configured to execute the instructions to receive, via the communications unit, a first signal that includes session data and a digital token. The session data may characterize a first communications session between a device and a first executed application program. The at least one processor is further configured to execute the instructions to perform operations that validate the digital token and based on the validation of the digital token, establish a second communication session between the device, the first executed application program, and a second application program executed by the apparatus. The second communications session may be established in accordance with a portion of the session data. Further, the at least one processor is configured to execute the instructions to generate and transmit, via the communications unit, a second signal that includes interface data identifying the second communications session. The second signal may include information that causes the device to present the interface data within a portion of a digital interface associated with the first communications session.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
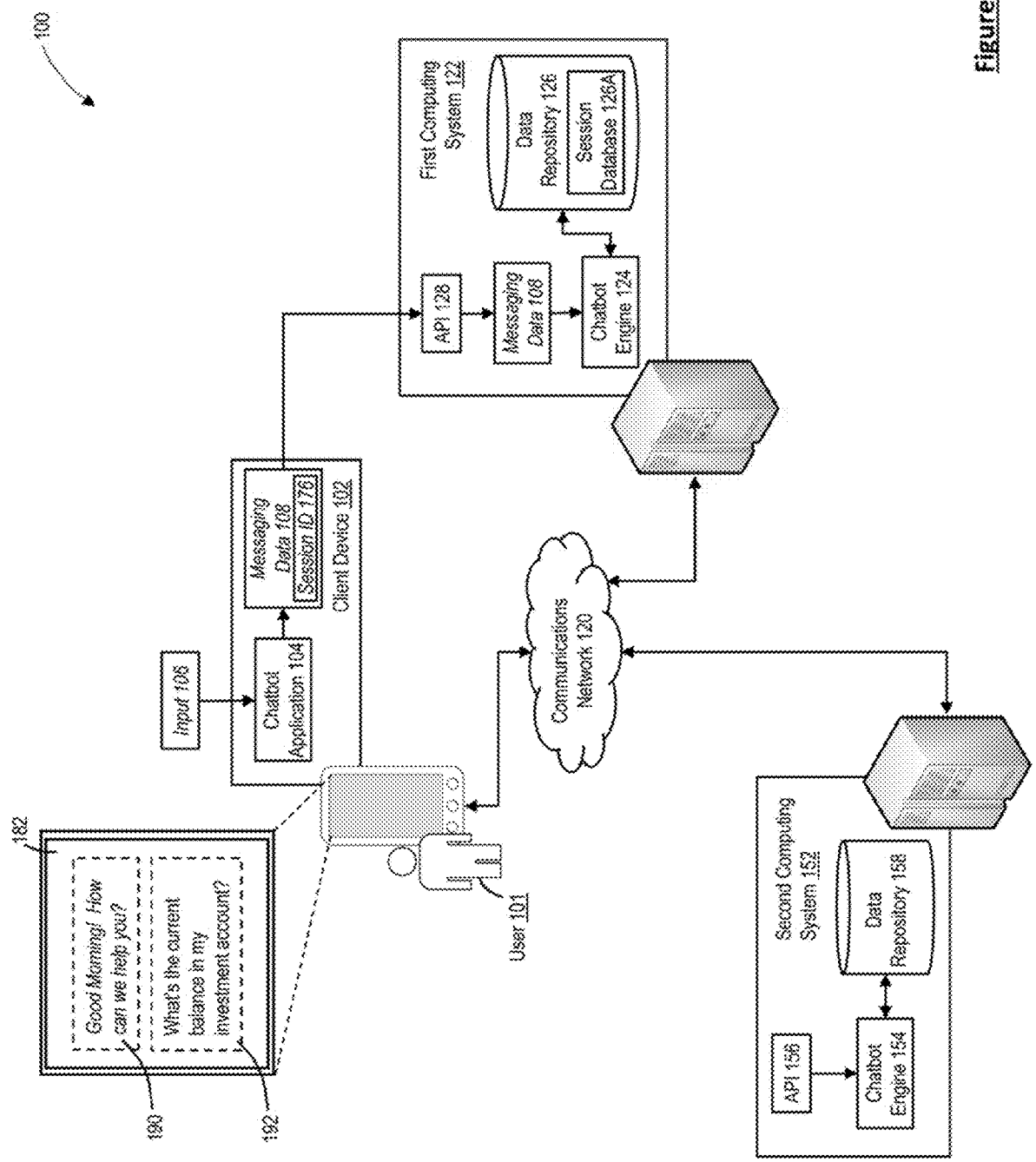
FIGS. 1A-1C and 2A-2C are block diagrams illustrating portions of an exemplary computing environment, in accordance with some exemplary embodiments.
Figure 1B:
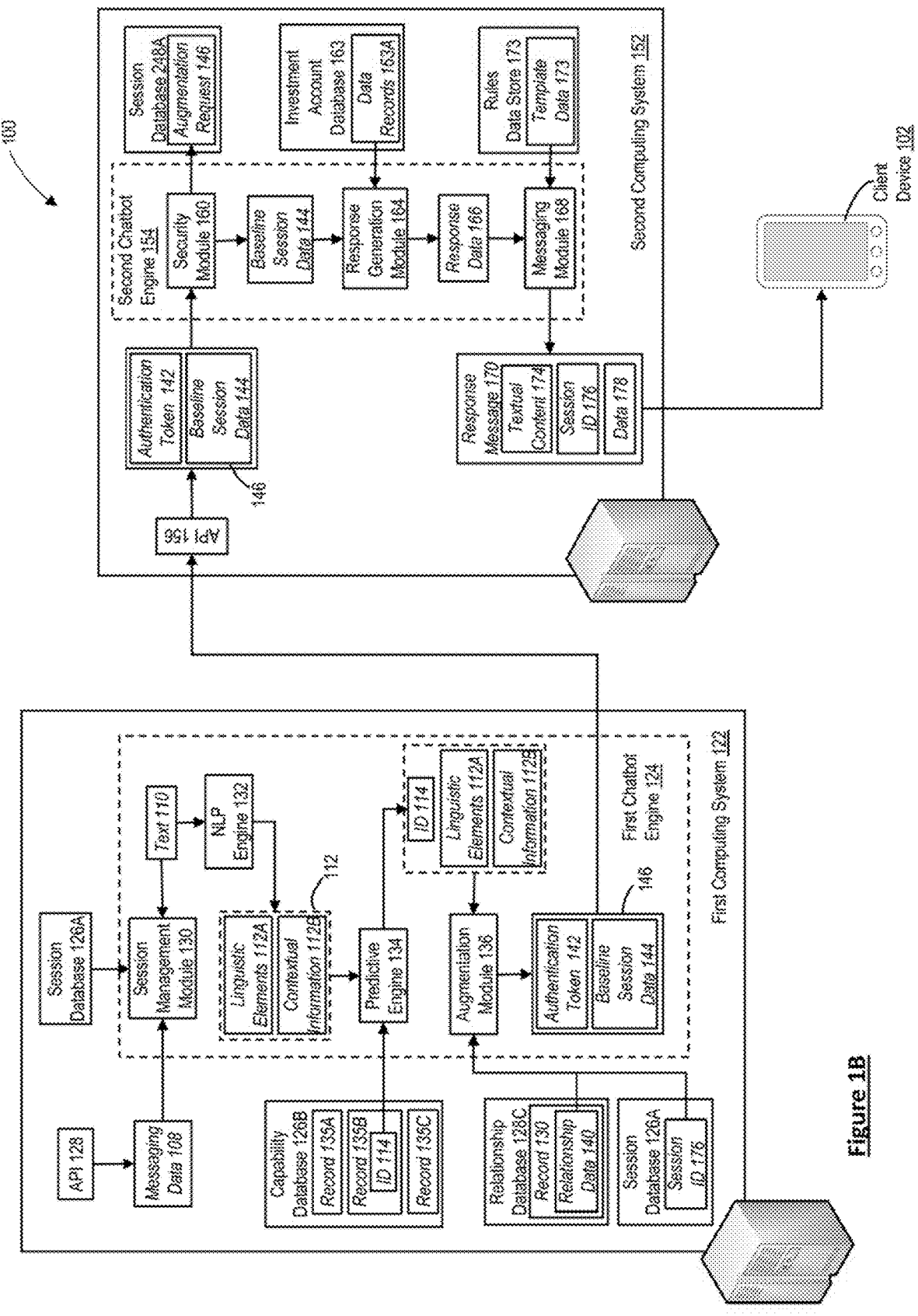
Figure 1C:
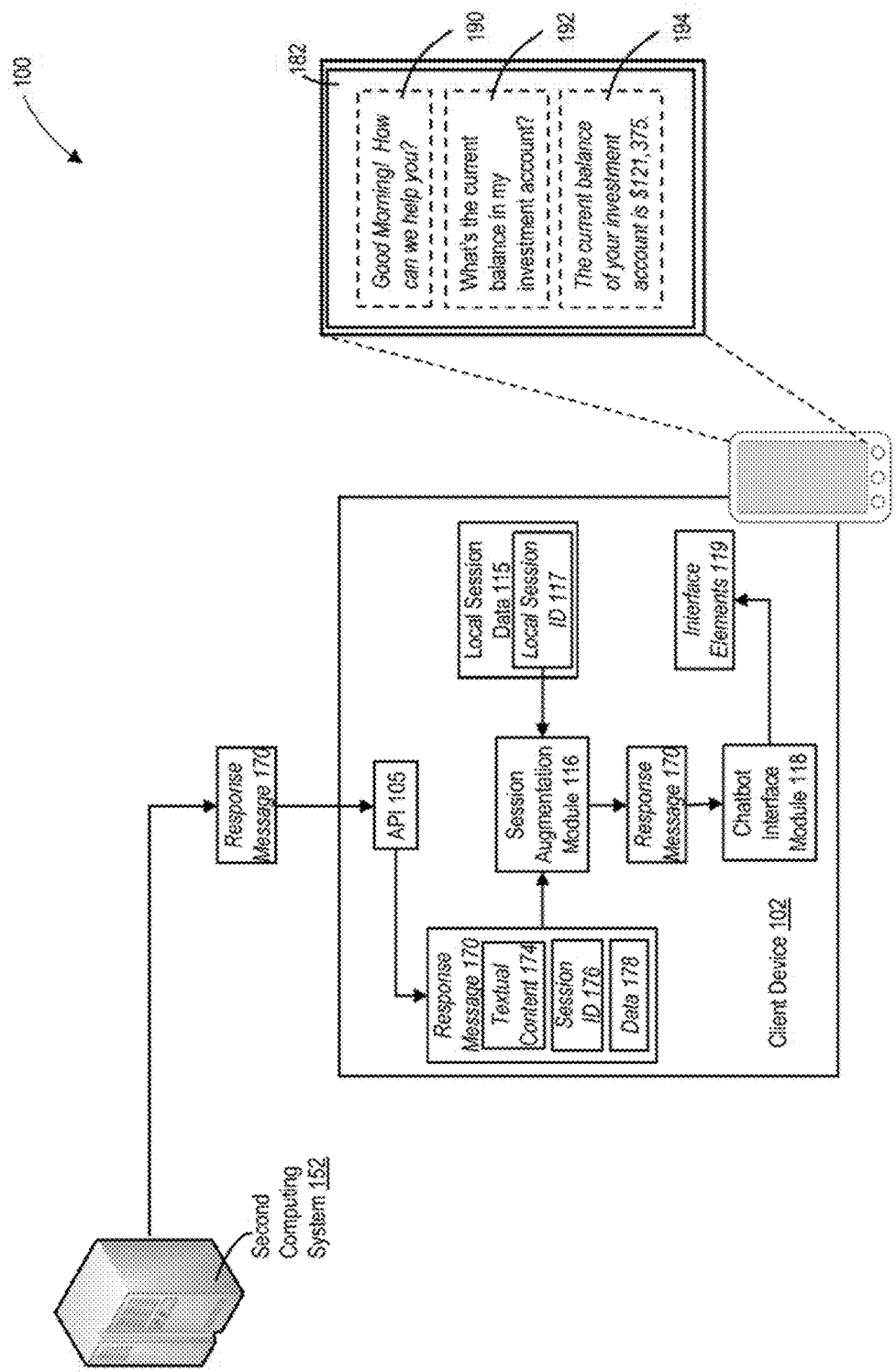

FIGS. 1A-1C illustrate components of an exemplary computing environment 100, which perform computerized processes that establish a communications session between a device and a responsive application, and based on natural language queries generated by the device, that augment or supplement the established communications session to include one or more additional responsive applications, in accordance with some exemplary implementations. By way of example, and referring to FIG. 1A, environment 100 includes a client device 102, such as a smart phone, tablet computer, wearable device, or other computing device associated with a user 101, a first computing system 122, and a second computing system 152, each of which may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some instances, client device 102 may include one or more tangible, non-transitory memories that store data and/or software instructions and one or more processors configured to execute the software instructions. The stored software instructions may, for example, include one or more application programs, one or more application modules, or other elements of code executable by the one or more processors. For instance, and as illustrated in FIG. 1A, client device 102 may store, within the one or more tangible, non-transitory memories, a chatbot application 104 that, when executed by the one or more processors, causes client device 102 to establish programmatically a communications session (hereinafter, a "chatbot" session) with an application program executed by one or more of first computing system 122 or second computing system 152, and to present message data exchanges during the established chatbot session within a portion of a digital interface (hereinafter, a "chatbot interface"). Examples of chatbot application 104 may include, but are not limited to, a web browser (e.g., Google Chrome™, Apple Safari™, etc.), a payment or banking application associated with a financial institution, or other executable applications that generate dedicated chatbot interfaces.

Client device 102 may also include a communications unit, such as one or more wireless transceivers, coupled to the one or more processors for accommodating wired or wireless internet communication with first computing system 122 or second computing system 152. Further, client device 102 may also include a display unit coupled to the one or more processors and configured to present interface elements to user 101, and one or more input units coupled to the one or more processors and configured to receive input from user 101, e.g., in response to messaging data rendered for presentation within the chatbot interface. By way of example, the display unit may include, but is not limited to, an LCD display, a TFT display, and OLED display, or other appropriate type of display unit, and one or more input units may include, but are not limited to, a keypad, keyboard, touchscreen, fingerprint scanner, microphone, voice activated control technology, stylus, or any other appropriate type of input unit. Further, in some examples, the functionalities of the display and input units may be combined into a single device, such as a pressure-sensitive touchscreen display unit that can present interface elements and can detect an input from user 101 via a physical touch.

As described herein, each of first computing system 122 and second computing system 152 may represent a computing system that includes one or more servers and tangible, non-transitory memory devices storing executable code and application modules. Further, the one or more servers may each include one or more processors, which may be configured to execute portions of the stored code or application modules to perform operations consistent with the disclosed embodiments. In some instances, first computing system 122 or second computing system 152 may can be incorporated into a single computing system, although in other instances, first computing system 122 or second computing system 152 can correspond to a distributed system that includes computing components distributed across communications network 120, such as those described herein, or those provided or maintained by cloud-service providers (e.g., Google Cloud™, Microsoft Azure™, etc.). The disclosed embodiments are, however, not limited to these exemplary distributed systems, and in other instances, first computing system 122 or second computing system 152 may include computing components disposed within any additional or alternate number or type of computing systems or across any appropriate network.

In one instance, first computing system 122 and additionally, or alternatively, second computing system 152 may be associated with, or operated by, a financial institution or other business entity that provides financial services to one or more customers, such as user 101. Examples of these financial services include, but are not limited to, establishing and maintaining a financial services account on behalf of a corresponding customer (e.g., a deposit account, a brokerage account, a credit card account or a revolving line of credit, etc.), issuing an insurance policy to a corresponding customer (e.g., term or whole life insurance policies, vehicle insurance policies, etc.), initiating a payment transaction involving a corresponding customer, initiating a sale or purchase of securities or on behalf of a corresponding customer, or servicing inquiries related to any of the financial services described herein. Further, in some instances, first computing system 122 and second computing system 152 may be associated with a single financial institution or business entity (e.g., represent different business units within a common financial institution). On other instances, and as described herein, first computing system 122 and second computing system 152 may be associated with different financial institutions or business entities.

As described herein, one or more of the application programs executed by client device 102, such as chatbot application 104, may perform operations that programmatically establish a communications session, e.g., a chatbot session, with one or more application programs executed by first computing system 122, such as first chatbot engine 124 in FIG. 1. For example, user 101 may provide input to client device 102, e.g., via the input unit, that requests an execution of chatbot application 104, and upon execution, chatbot application 104 may perform operations that generate and render one or more interface elements for presentation on a corresponding authentication interface, e.g., via a corresponding display unit (not illustrated in FIG. 1A). In some examples, the authentication interface may include interface elements that prompt user 101 to provide, via the input unit, input that specifies one or more authentication credentials, such as, but not limited to, an alphanumeric login credential, an alphanumeric password, or a biometric credential (e.g., a fingerprint scan, a facial image, etc.).

Based on the provided authentication credentials, executed chatbot application 104 may perform operations that authenticate an identity of user 101 based on locally maintained authentication data and/or based on information exchanged with first computing system 122 through a programmatic interface, such as application programming interface (API) 128. Responsive to a successful authentication of the identity of user 101, executed chatbot application 104 may perform additional operations that generate a request to initiate a chatbot session with first chatbot engine 124. The request may include, but is not limited to, data confirming a successful authentication of the identity of user 101 (e.g., an application cryptogram having a predetermined format), an identifier of user 101 (e.g., the login or biometric credential, etc.), and/or an identifier of client device 102 (e.g., an IP or MAC address), and client device 102 may transmit the generated request across communications network 120 to first computing system 122, e.g., using any appropriate communications protocol.

API 128 may receive the request, and upon execution by first computing system 122, first chatbot engine 124 may perform operations that verify the authenticity of the request and confirm the authentication of the identity of user 101 by client device 102, e.g., based on the confirmation data, the user identifier, and/or the device identifier. Based on a successful verification and confirmation, first chatbot engine 124 may perform operations that initiate the chatbot session with chatbot application 104, e.g., based on an established handshake between API 128 and the communications unit of client device 102 (not illustrated in FIG. 1A). First chatbot engine 124 may perform additional operations that generate an initial, introductory message for the established chatbot session based on, among other things, one or more predetermined rules that specify appropriate introductory messages (e.g., as maintained locally within the one or more tangible, non-transitory memories, such as data repository 126), a time or date at which first chatbot engine 124 established the chatbot session, and additionally, or alternatively, the user or device identifiers.

For example, the introductory message may include textual content that includes a greeting and that prompts user 101 to further interact with the established chatbot session (e.g., "Good morning! How can we help you?), and first chatbot engine 124 may perform operations that generate introductory message data specifying the introductory message. Further, first chatbot engine 124 may perform additional operations that generate one or more elements of session data identifying and characterizing the established chatbot session, and store the generated elements within a portion of the one or more tangible, non-transitory memories, e.g., within data records of session database 126A of data repository 126. The generated session data may include, but is not limited to, an alphanumeric session identifier 176, the user identifier and the device identifier (and in some instances, the confirmation data), a time or date at which first chatbot engine 124 initiated the chatbot session, and/or data characterizing the introductory message. In some instances, and as described herein, the data records of session database 126A may establish a time-evolving record of the messages exchanged between first chatbot engine 124 and executed chatbot application 104 during the established chatbot session.

In some instances, executed first chatbot engine 124 may perform operations that cause first computing system 122 to transmit, across communications network 120, the introductory message data and information identifying the established chatbot session, such as, but not limited to, session identifier 176, to client device 102. A secure programmatic interface associated with executed chatbot application 104, such as application programming interface (API) 105, may receive the introductory message data and session identifier 176, and executed chatbot application 104 may perform operations that store the introductory message data and session identifier 176 within one or more tangible, non-transitory memories.

Responsive to the receipt of the introductory message data, executed chatbot application 104 may generate, and render for presentation, an additional digital interface, e.g., a chatbot interface 182, that includes the introductory message data and facilitates an ongoing and simulated conversation between user 101 and a chatbot generated or hosted programmatically by first chatbot engine 124 of first computing system 122. In some instances, chatbot application 104 may perform operations that generate, and render for presentation, all or a portion of the introductory message data (e.g., "Good Morning! How can we help?) for presentation within chatbot interface 182, e.g., as introductory message 190. The automatic presentation of introductory message 190 may simulate a conversation between user 101 and the programmatic chatbot maintained by first computing system 122 and as illustrated in FIG. 1A, introductory message 190 greets user 101 and prompts user 101 to further interact with the established chatbot session.

As described herein, first computing system 122 may be associated with, or operated by, a financial institution that provides one or more financial services to various customers, such as user 101. For example, first computing system 122 may be associated with a particular business unit of the financial institution that provides a subset of the financial services to user 101, such as, but not limited to, a retail banking unit that establishes, maintains, and provisions one or more deposit accounts, debit card accounts, credit card accounts, or lines of credit to user 101. Via chatbot interface 182, user 101 may interact with the established chatbot session to resolve inquiries associated with the subset of the financial services, such as, but not limited to, a request for a current balance of a checking account or a credit card account issued by the financial institution, a request to initiate bill-payment transaction involving the checking account, a request to replace a physical transaction card associated with a credit or debit card account issued by the financial institution, or a request that first computing system 122 provision client device 102 with one or more application programs (e.g., mobile payment or banking applications). In some instances, and based on messaging data transmitted programmatically to first computing system 122 by chatbot application 104, first chatbot engine 124 may perform any of the exemplary processes described herein to parse the receive message data to identify an underlying inquiry, to generate textual content in response to the underlying query based on locally available data, e.g., as maintained within data repository 126, and to transmit additional messaging data that includes the textual content to client device 102, e.g., for presentation within chatbot interface 182.

In other instances, the established chatbot session may involve an inquiry unrelated to those services provided to user 101 by the retail banking unit of the financial institution, and as such, first chatbot engine 124 may be incapable of generating programmatically a response to that underlying inquiry based on elements of sensitive customer, account, or transaction maintained by first computing system 122. For example, input data provided by user 101 to chatbot interface 182 (e.g., via the input unit of client device 102), and messaging data generated by chatbot application 104, may include an inquiry referencing a product or service provided by another business unit of the financial institution (e.g., an insurance product, a sale or a purchase of a security) or an inquiry related to a product or service provided by an additional, unrelated financial institution (e.g., an inquiry regarding an account balance of an account held at a different financial institution).

Based on a receipt of messaging data that includes such an unrelated inquiry, executed first chatbot engine 124 may perform any of the exemplary processes described herein to identify an additional computing system that operates within environment 100 and is configured to, or capable of, accessing data responsive to each of the unrelated inquiry and further, to augment dynamically the established chatbot session to include another chatbot engine that, when executed by the additional computing system, generates a response to the unrelated inquiry and transmits the additional messaging data to client device 102 for presentation within chatbot interface 182. In some examples, the dynamic augmentation of the established chatbot session may facilitate an ongoing and simulated conversation between user 101 and the chatbot programmatically generated by first chatbot engine 124 (e.g., as executed by first computing system 122) and by the additional computing system.

Further, certain of these exemplary processes, as described herein, provision a single digital interface, e.g., chatbot interface 182, with message data responsive to user inquires related to, and unrelated to, the financial services offered to user 101 by the financial institution operated by or associated with first chatbot engine 124, and can be implemented in addition to, or as an alternate to, conventional processes that, upon detection of the unrelated inquiry by first chatbot engine 124, generate predetermined messaging data indicative of an inability of first chatbot engine 124 to resolve the inquiry, or provision to chatbot interface 182 additional content (e.g., a hyperlink, deep link, etc.) identifying resources capable of resolving the unrelated inquiry. In some instances, an implementation of certain of the exemplary processes described herein, which generate and present messaging data response to related and unrelated inquiries within a single digital interface, may improve an ability of user 101 to interact with the augmented chatbot sessions using communications devices having limited size, display, or input functionalities, e.g., smart phones, smart watches, or other wearable form factors characterized by a limited ability to parse through, and interact with, additional linked interfaces disposed across multiple display screens.

Referring back to FIG. 1A, and responsive to introductory message 190, user 101 may provide additional input 106 to chatbot interface 182 via the input unit of client device 102. In some instances, additional input 106 may include textual input provided using a miniaturized "virtual" keyboard presented within chatbot interface 182 by a pressure-sensitive, touchscreen display unit of client device 102, or using a keypad or keyboard included within, or coupled to client device 102. In other instances, additional input 106 may include an audible utterance provided to a microphone included within, or coupled to, client device 102.

In some instances, additional input 106 may include an inquiry unrelated to the products or services provided to user 101 by the retail banking unit, such as, but not limited to, a current value of a brokerage or investment account maintained by an investment banking unit of the financial institution. As illustrated in FIG. 1A, executed chatbot application 104 may receive additional input 106, and may perform operations that render additional input 106 for presentation as an additional message 192 within chatbot interface 182, e.g., "What's the current balance in my brokerage account?". Further, when additional input 106 includes audio content, e.g., the spoken utterance, chatbot application 104 may perform operations (not illustrated in FIG. 1A) that convert or transform the audio content into textual content representative of the spoken utterance based on an application of one or more speech recognition algorithms to all, or to selected portions, of the audio content.

Chatbot application 104 may perform operations that package all, or a selected portion, of additional input 106 into corresponding portions of messaging data 108. In some instances, messaging data 108 may include textual content that specifies additional message 192 (e.g., "What's the current balance of my investment account?"), along with session identifier 176 and temporal data characterizing a time or date at which user 101 provided additional input 106 to client device 102. Additionally, or alternatively, messaging data 108 may also include a unique identifier of user 101 (e.g., a login credential, a digital identifier, etc.), a unique identifier of client device 102 (e.g., an IP address, a MAC address, etc.), and/or an application cryptogram generated by executed chatbot application 104. Chatbot application 104 may perform additional operations that cause client device 102 to transmit messaging data 108 across communications network 120 to first computing system 122, e.g., using any appropriate communications protocol.

First computing system 122 may receive messaging data 108 through a secure programmatic interface, such API 128 of first chatbot engine 124. In some instances, not illustrated in FIG. 1A, first chatbot engine 124 may perform operations that verify messaging data 108 is associated with, and was generated during the established chatbot session with chatbot application 104. For example, first chatbot engine 124 may parse messaging data 108 and extract session identifier 176, the user identifier of user 101, the device identifier of client device 102, and/or the application cryptogram associated with executed chatbot application 104. Executed first chatbot engine 124 may also access locally maintained copies of the session identifier, the user identifier, the device identifier, and/or the application cryptogram associated with the established chatbot session, e.g., as stored within the data records of session database 126A, and perform operations that verify a correspondence between the extracted and locally accessible copies of the session identifier, the user identifier, the device identifier, and/or the application cryptogram.

If, for example, executed first chatbot engine 124 were determine an inconsistency between one or more of the extracted and locally accessible copies of the session identifier, the user identifier, the device identifier, and/or the application cryptogram, first chatbot engine 124 may discard received messaging data 108, terminate the established chatbot session, and generate and transmit and error message to client device 102, e.g., through API 128 (not illustrated in FIG. 1A). Alternatively, and response to an established consistency between the extracted and locally accessible copies of the session identifier, the user identifier, the device identifier, and/or the application cryptogram, executed first chatbot engine 124 may perform operations that associate received messaging data 108 with the established chatbot session and store received messaging data 108 within a corresponding portion of session database 126A. In some instances, executed first chatbot engine 124 may also perform any of the exemplary processes described herein to identify and characterize one or more inquiries specifies within messaging data 108 (and one or more products or services associated with the unrelated inquiry), to identify an additional computing system capable of accessing data responsive the inquiry and further, to augment the established chatbot session to include an another chatbot engine that, when executed by that identified computing system, generates a messaging data responsive to the unrelated inquiry.

Referring to FIG. 1B, received messaging data 108 may be routed to a session management module 130 of executed first chatbot engine 124, which may perform operations that parse messaging data 108 to extract textual data 110 (e.g., representative of additional message 192, including "What's the current balance of my investment account?"). In some instances, session management module 130 may generate a programmatic command that executes a natural language processing (NLP) engine 132 of first chatbot engine 124, and as illustrated in FIG. 1B, session management module 130 may provide extracted textual data 110 as an input to executed NLP engine 132. In other instances, consistent with the disclosed exemplary embodiments, a functionality of session management module 130 may be performed by executed NLP engine 132, and API 128 may route received messaging data 108 directly to executed NLP engine 132, which may process messaging data 108 and extract textual data 110.

NLP engine 132 may receive textual data 110, and may apply one or more natural language processing (NLP) algorithms or techniques to all or a portion of textual data 110. Based on the application of these natural language processing algorithms, NLP engine 132 may identify one or more discrete linguistic elements (e.g., a word, a combination of morphemes, a single morpheme, etc.) within textual data 110, and may establish a context and a meaning of combinations of the discrete linguistic elements, e.g., based on the identified discrete linguistic elements, relationships between these discrete linguistic elements, and relative positions of these discrete linguistic elements within textual data 110. In some instances, NLP engine 132 may generate output data 112 that include linguistic element data 112A and contextual information 112B.

As described herein, linguistic element data 112A each of the discrete linguistic elements, and contextual information 112B that specifies the established context or meaning of the combination of the discrete linguistic elements. The established context or meaning of the combination of the discrete linguistic elements may, for example, identify a product or service associated with or requested by additional message 192, e.g., as specified by the unrelated inquiry within textual data 110, and additionally, or alternatively, may identify a particular data type or data class that would be responsive to that inquiry. As described herein, textual data 110 may include an inquiry related to a particular product (e.g., a credit card account, an investment account, an insurance policy, etc.), a request for a performance of a particular service (e.g., providing an account balance, etc.), or a request for a particular mobile application to be provisioned to client device 102. In some instances, and based on the application of the natural language processing techniques, executed NLP engine 132 may generate contextual information 112B that characterizes the inquiry associated with additional message 192, the product or service specified by that inquiry, and further, specific types or classes of data, if accessible to first chatbot engine 124, would facilitate a generation of a response to the inquiry (e.g., "responsive" data types or classes).

Examples of these NLP algorithms or techniques may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the NLP algorithms or techniques may also include one or more artificial intelligence models, such as, but not limited to, an artificial neural network model, a recurrent neural network model, a Bayesian network model, or a Markov model. Further, the NLP algorithms or techniques may also include one or more statistical processes, such as those that make probabilistic decisions based on attaching real-valued weights to elements of certain input data.

By way of example, and as described herein, textual data 110 may be representative of additional message 192 provided by user 101 as an input to chatbot interface 182 of FIG. 1A, e.g., "What's the balance in my investment account?". Based on the application of the exemplary NLP algorithms or techniques described herein to textual data 110, NLP engine 132 may identify discrete linguistic elements (e.g., discrete words, etc.) that include, but are not limited to, "what," "is," "the," "balance," "in," "my," "investment," and "account," each of which may be packaged into a corresponding portion of linguistic element data 112A. Based on the application of any of the NLP algorithms or techniques described herein to the discrete linguistic elements, e.g., alone or in ordered combinations, NLP engine 132 may determine that additional message 192 corresponds to balance inquiry (e.g., the particular service) involving an investment account held by user 101 (e.g., the particular product), and further, may identify a particular data type or class that facilitates a response to the balance inquiry (e.g., account or transaction data characterizing the investment account of user 101). In some instances, and as described herein, the responsive data type or data class, which resolves the balance inquiry, may be unavailable to first computing system 122 and as such, to executed first chatbot engine 124.

NLP engine 132 may package information identifying the particular service, the particular product, and in some instances, the responsive data type or data class into corresponding portions of contextual information 112B, and NLP engine 132 may provide output data 112, which includes linguistic element data 112A and contextual information 112B, as an input to a predictive engine 134. In some instances, predictive engine 134 may be configured to accept input data having a particular structure or format (e.g., "encoded" input data), and NLP engine 132 may be configured to generate structured portions of linguistic element data 112A and contextual information 112B that are consistent with, and compatible with, the particular structure or format of the encoded input data. As described herein, and upon execution by first computing system 122 (e.g., based on a programmatic command generated by executed first chatbot engine 124), predictive engine 134 may perform operations that determine capability of executed first chatbot engine 124 to generate a response to additional message 192 based on locally accessible data, e.g., as maintained within data repository 126.

In one instance, predictive engine 134 may determine the capability of executed first chatbot engine 124 to generate the response to additional message 192 based on one or more structured or unstructured data records maintained within a locally accessible capability database 126B, e.g., as maintained within data repository 126. For example, each of the data records of capability database 1266 may be associated with a corresponding computing system that operates within environment 100 and that executes a corresponding chatbot engine, such as, but not limited to, first computing system 122 that executes first chatbot engine 124. As described herein, each of the computing systems may be associated with a financial institution, or a particular business unit of a financial institution, that provides financial products or services to customers, and the data record associated with each of the computing systems may include identification data that uniquely identifies the computing system (such as, but not limited to, an IP address, a network address of a corresponding API of the chatbot engine, etc.) and the associated financial institution or business unit (such as, but not limited to, a trade name, a bank identification code (e.g., a SWIFT™ code), or a name of the business unit (e.g., retail banking, investment banking, insurance, etc.). Further, in some instances, the data record associated with each of the computing systems may also link the identification data to capability data that specifies one or more products or services provided by the corresponding financial institution or business unit, and further, one or more data classes or types available to or locally maintained by the computing system.

By way of example, first computing system 122 may be associated with a retail banking unit of a particular financial institution, and a data record 135A maintained within capability database 126B may include identification data that specifies, among other things, an IP address of first computing system 122, a network address of associated with API 128, and a unique identifier of the retail banking unit and particular financial institution. Further, data record 135A may also include information that identifies one or more products or services provided to customers by the retail banking unit (e.g., balance inquiries regarding deposit accounts, debit card accounts, credit card accounts, or lines of credit, etc.) and additionally, or alternatively, information that identifies one or more types or classes of data available for responding to inquiries identified by executed first chatbot engine 124 (e.g., account data characterizing balances of deposit accounts, debit card accounts, credit card accounts, or lines of credit, etc.). In other examples, capability database 126B may also include additional data records, such as data record 135B, associated with other business units of that particular financial institution, such as an investment banking unit, and additional data records, such as data record 135C, associated with a business unit of a third-party financial institution unrelated to the particular financial institution, such as a retail banking unit of the third-party financial institution. Each of additional data records 135B and 135C may be structured in a matter similar to data record 135A, and may include corresponding elements of identification and capability data similar to those described herein in reference to data record 135A.

Referring back to FIG. 1B, predictive engine 134 may access capability database 126B, and identify the data records associated with first computing system 122, e.g., data record 135A. Predictive engine 134 may further parse the information maintained within data record 135A to determine whether executed first chatbot engine 124 is capable of generating messaging data responsive to the inquiry associated with additional message 192, e.g., balance inquiry regarding user 101's investment account at the particular financial institution, as specified within contextual information 112B. Although not illustrated in FIG. 1B, if predictive engine 134 were to determine that the retail banking unit of the financial institution provides investment and brokerage services to customers, predictive engine 134 may establish the capability of executed first chatbot engine 124 to respond to the inquiry specified within additional message 192, e.g., based on locally accessible customer, account, or transaction data. In some instances, and based on the established capability, executed first chatbot engine 124 may perform operations that generate a response to the unrelated inquiry based on a selected portion of the customer, account, or transaction data, and transmit the response across communications network 120 to executed chatbot application 104, which may present the response within chatbot interface 182 during the established chatbot session.

Alternatively, based on identified data record 135A, predictive engine 134 may determine that the retail banking unit is unable to determine the account balance of the investment account of user 101 based on locally accessible customer, account data, or transaction data, e.g., that data record 135A fails to include information that identifies a provisioning of balance inquiries regarding investment accounts as a provided product or service, or that data record 135A does not indicate that investment account information is locally accessible at first computing system 122. In some instances, predictive engine 134 may perform operations that parse one or more additional data records of capability database 126B, e.g., data record 135B, to identify an additional computing system, and corresponding chatbot application, capable of responding to the balance inquiry regarding the investment account of user 101 at the particular financial institution.

For example, and based on additional data record 135B, predictive engine 134 may determine that second computing system 152, which is associated with an investment banking unit of the particular financial institution, locally maintains account data characterizing the balance of the investment account of user 101 and as such, that a chatbot engine executed by second computing system 152 (e.g., second chatbot engine 154) is capable of responding to the unrelated inquiry. In some instances, illustrated in FIG. 1B, predictive engine 134 may parse data record 135B and extract a unique system identifier 114 of second computing system 152, such as an IP address or a MAC address, and provide extracted system identifier 114 (and linguistic element data 112A and contextual information 112B), as inputs to an augmentation module 136 of first chatbot engine 124. When executed (e.g., via a programmatic command generated by first chatbot engine 124), augmentation module 136 may perform any of the exemplary processes described herein to augment the established chatbot session to include second chatbot engine 154 that, when executed by second computing system 152, generates messaging data responsive to the unrelated inquiry.

When executed by first computing system 122, augmentation module 136 may receive system identifier 114, along with linguistic element data 112A and contextual information 1126, and may perform operations to establish an existence of a relationship, or a lack thereof, between first computing system 122 and identified second computing system 152. For example, a relationship can exist between first computing system 122 and second computing system 152 when, among other things, first computing system 122 and second computing system 152 are associated with or operated by a common financial institution, e.g., retail and investment banking divisions of the same financial institution. In other instances, a relationship can exist between first computing system 122 and second computing system 152 when the entities that operate these computing systems are associated with or operated by related entities or financial institutions (e.g., that exhibit a corporate relationship, such as a parent and subsidiary, or by entities or financial institutions characterized by another formal or informal relationship (e.g., members of a consortium or industry organization, etc.).

As described herein, the established existence of the relationship may enable executed second chatbot engine 154 to establish a secure, programmatic communications session with executed chatbot application 104 based on a prior authentication between executed chatbot application 104 and executed first chatbot engine 124. The prior authentication between executed chatbot application 104 and executed first chatbot engine 124 may also confirm that user 101 consented to an access of sensitive customer, account, or transaction data by executed first chatbot engine 124, and in some instances, the existence of that relationship may imply that second chatbot engine 154 may rely on the provided consent to access similarly sensitive customer, account, or transaction data maintained locally at second computing system 152.

In some instances, and to establish the existence of the relationship between first computing system 122 and second computing system 152, augmentation module 136 may access data records of a relationship database 126C, e.g., as maintained within data repository 126 of first computing system 122. The data records of relationship database 126C may associate a unique system identifier of first computing system 122 (e.g., an IP address, a MAC address, etc.) with the unique system identifiers of one or more additional computing systems that exhibit any of the exemplary relationships described herein, such as, but not limited to, second computing system 152, and further, with additional data characterizing the existence or scope of the relationship between first computing system 122 and each of the one or more additional computing systems.

As illustrated in FIG. 1B, augmentation module 136 may parse relationship database 126C to identify a corresponding one of the data records that references system identifier 114 of second computing system 152, e.g., data record 138. Augmentation module 136 may process data record 138 to access and extract relationship data 140, which characterizes the existence and/or scope of the relationship between first computing system 122 and second computing system 152. Further, and based on all or a portion of relationship data 140, augmentation module 136 may establish the existence, or lack thereof, of the relationship between first computing system 122 and second computing system 152.

By way of example, and as described herein, extracted relationship data 140 may specify that first computing system 122 and second computing system 152 represent discrete retail and investment banking units of a common financial institution. In some instances, and based on extracted relationship data 140, executed augmentation module 136 may establish the existence of the relationship between first computing system 122 and second computing system 152, and may determine the capability of second computing system 152 to rely on a prior authentication of user 101 with first computing system 122, e.g., based on data programmatically exchanged between executed chatbot application 104 and executed first chatbot engine 124 upon establishment of the chatbot session.

Responsive to the established relationship, augmentation module 136 may perform operations that generate a digital token representative of that prior authentication and/or consent of user 101 based on the data programmatically exchanged between executed chatbot application 104 and executed first chatbot engine 124, such as, but not limited to, authentication token 142 of FIG. 1B. For example, augmentation module 136 may generate authentication token 142 based on an application of one or more token-generation algorithms or processes to input data that includes, but is not limited to, an identifier of client device 102 and/or executed chatbot application 104 (e.g., a network address of client device 102, such as an IP address, an identifier or address of a programmatic interface of executed chatbot application 104, etc.), a portion of messaging data 108 (e.g., that characterizes the inquiry specified within additional message 192), and additionally, or alternatively, portions of linguistic element data 112A and contextual information 112B. In some instances, authentication token 142 may be characterized by a structure specified by, or recognized by, second chatbot engine 154 and/or a programmatic interface of second chatbot engine 154 (e.g., application programming interface (API) 156 of FIG. 1B), and examples of authentication token 142 include, but are not limited to, a cryptogram, a hash, random number, or other element of cryptographic data having a predetermined length or structure (e.g., a number of leading or trailing zeroes, etc.).

As described herein, authentication token 142 may confirm, to API 156, that executed first chatbot engine 124 is authorized to access second chatbot engine 154 and further, to access sensitive customer, account, or transaction data locally maintained by second computing system 152 (e.g., within one or more tangible, non-transitory memories), which would ordinarily be accessible to executed second chatbot engine 154, but that would ordinarily be inaccessible to executed first chatbot engine 124. Further, and in some instances, one or more of the exemplary processes described herein that generate authentication token 142 in response to the established relationship between first computing system 122 and second computing system 152 can be implemented in addition to, or as an alternate to, conventional token-based authentication processes, such an OAuth protocol, that would otherwise be implemented between first chatbot engine 124 (e.g., as executed by first computing system 122) and API 156 (e.g., as associated with second chatbot system 152) to confirm an authentication of user 101 and a level of consent provided by user 101.

In some instances, not illustrated in FIG. 1B, augmentation module 136 perform operations that store authentication token 142 in a corresponding portion of relationship database 126C, e.g., within data record 138, and may associate authentication token 142 with stored system identifier 114 and relationship data 140, which identify and characterize second computing system 152. For example, authentication token 142 may be associated with a fixed period of validity (e.g., one minute, five minutes, thirty minutes, etc.) or a variable period of validity (e.g., based on activity within the established chatbot session, etc.), and in certain exemplary embodiments, augmentation module 136 may perform operations that extract a locally stored copy of authentication token 142 from data record 138 in response to the established relationship between first computing system 122 and second computing system 152 (e.g., during the fixed or variable period of validity and in addition to, or as an alternate to, the exemplary processed described herein that generate authentication token 142).

Referring back to FIG. 1B, augmentation module 136 may also perform operations that generate elements of data, e.g., baseline session data 144, that identify and characterize the established chatbot session between chatbot application 104 (e.g., as executed by client device 102) and first chatbot engine 124 (e.g., as executed by first computing system 122). In some instances, the generated elements of baseline session data 144 may include, but are not limited to: session identifier 176; information that uniquely identifies client device 102 and/or executed chatbot application 104 (e.g., a network address of client device 102, such as an IP address, an identifier or address of a programmatic interface of executed chatbot application 104, etc.); raw message data characterizing the inquiry specified within additional message 192 (e.g., a portion of textual data 110); and additionally, or alternatively, portions of linguistic element data 112A and contextual information 112B, which specify the discrete linguistic elements included within additional message 192 and the established context or meaning of the combination of the discrete linguistic elements. In some instances, augmentation module 136 may perform operations that package authentication token 142 and baseline session data 144 into corresponding portions of an augmentation request 146, which first computing system 122 may transmit, across communications network 120 to second computing system 152, e.g., using any appropriate communications protocol.

A programmatic interface maintained by second computing system 152, e.g., API 156, may receive augmentation request 146. In some instances, API 156 may perform operations that access authentication token 142 within augmentation request 146, and that determine whether a structure of authentication token 142 (e.g., a token length, a number of leading or trailing zeroes, etc.) is consistent with, or corresponds to, a predetermined token structure associated with API 156 (e.g., an "expected" token structure). In some instances, second computing system 152 may store data characterizing the expected token structure, or data characterizing one or more token-generation algorithms or processes that generate an authentication token having the expected token structure based on corresponding input data, within one or more tangible, non-transitory memories, e.g., within a portion of data repository 158 accessible to API 156 and second chatbot engine 154.

If, for example, API 156 were to detect an inconsistency between the expected token structure and the structure of authentication token 142, API 156 may decline to establish communications with executed first chatbot engine 124, and second computing system 152 may generate and transmit an error message indicative of the detected inconsistency to first computing system 122, e.g., across communications network 120 using any appropriate communications protocol. Alternatively, if API 156 were to detect a consistency between the expected token structure and the structure of authentication token 142, API 156 may establish a secure, programmatic channel of communications between first chatbot engine 124 (e.g., as executed by first computing system 122) and second chatbot engine 154 (e.g., as executed by second computing system 152).

In some instances, API 156 may route augmentation request 146, which includes authentication token 142 and baseline session data 144, to a security module 160 of second chatbot engine 154, which may perform operations that validate authentication token 142. By way of example, when executed by second computing system 152 (e.g., based one or more commands programmatically generated by executed second chatbot engine 154), security module 160 may perform operations that compute a local copy of authentication token 142 using any of the exemplary processes described herein, and that validate authentication token 142, and the prior authentication of the identity of user 101 during the established chatbot session, based on a comparison of the received and locally computed copies of authentication token 142.

If security module 160 were to detect an inconsistency between the received and locally computed copies of authentication token 142, security module 160 may decline to validate authentication token 142, and second chatbot engine 154 may decline to rely on the prior authentication when establishing a secure, programmatic communications session with executed chatbot application 104 (e.g., which augments the established chatbot session to include second chatbot engine 154). In one instance, and in response to the failed validation, executed second chatbot engine 154 may generate and transmit an error message indicative of the failed validation across network 120 to first computing system 122, which may cause executed first chatbot engine 124 to perform operations that select another computing system capable of responding to the inquiry specified within additional message 192, that prompt user 101 to obtain information responsive to the inquiry through out-of-session channels, or that initiate one or more token-based authentication token-based authentication and consent processes, such as an OAuth protocol, in conjunction with application programs executed by client device 102 and second computing system 152.

If, however, security module 160 were to establish a consistency between the received and locally computed copies of authentication token 142, security module 160 may validate authentication token 142, and second chatbot engine 154 may rely on that prior authentication when establishing the secure, programmatic communications session with chatbot application 104 (e.g., as executed by client device 102). In response to the successful validation of the prior authentication by security module 160, executed second chatbot engine 154 may perform operations that establish a handshake between API 156 and the communications interface of client device 102, which facilitates secure, programmatic communications and exchanges of data between second chatbot engine 154 (e.g., as executed by second computing system 152) and chatbot application 104 (e.g., as executed by client device 102).

Security module 160 may also perform operations that store augmentation request 146 including now-validated authentication token 142 and baseline session data 144, within one or more tangible, non-transitory memories, e.g., within one or more data records of session database 162 of data repository 158. Further, and responsive to the validation of the prior authentication, security module 160 may route baseline session data 144 to one or more additional application modules of second chatbot engine 154 that, upon execution, perform any of the exemplary processes described herein to generate a response to the unrelated inquiry (e.g., the request for the balance of user 101's investment account) based on portions of baseline session data 144 and locally accessible elements of sensitive customer, account, or transaction data, and to provision the generated response for presentation within chatbot interface 182 during an augmented chatbot session that includes chatbot application 104, first chatbot engine 124, and second chatbot engine 154

By way of example, as illustrated in FIG. 1B, security module 160 may route baseline session data 144 to a response generation module 164 of executed second chatbot engine 154. As described herein, baseline session data 144 may include a unique identifier of user 101 (e.g., a login credential, etc.), client device 102 (e.g., a network address, such as an IP address, etc.), or chatbot application 104 (e.g., an address of a corresponding programmatic interface, etc.). Further, as also described herein, baseline session data 144 may also associate each of the unique identifiers with additional information that characterizes the inquiry specified within additional message 192, such as, but not limited to, all or a portion of textual data 110, linguistic elements data 112A and additionally, or alternatively, contextual information 112B.

When executed by second chatbot engine 154 (e.g., based on one or more programmatically generated commands), response generation module 164 may parse baseline session data 144 to extract one or more of the unique identifiers of user 101, client device 102, and/or executed chatbot application 104, and all or a portion of contextual information 112B, which characterizes the unrelated inquiry, the product or service specified by the unrelated inquiry, and further, the responsive data type or class. In some instances, response generation module 164 may access one or more elements of the sensitive customer, account, or transaction data (e.g., as maintained within data repository 158) that are consistent with the extracted identifiers and the extracted portion of contextual information 112B, and based on the accessed elements of sensitive customer, account, or transaction data, generate a response to the unrelated inquiry and package the generated response into one or more elements of response data 166.

Further, in some examples, response generation module 164 may also package, into the one or more elements of response data 166, certain portions of baseline session data 144 that identify and characterize the inquiry, such as, but not limited to, an inquiry type (e.g., the balance inquiry specified within contextual information 112B) and a subject of the inquiry (e.g., the investment account of user 101, as specified within contextual information 112B). In some instances, the packaged portions of baseline session data 144 may correspond to metadata that, when associated with the generated response within the one or more elements of response data 166, further describes or characterizes the generated response and facilitates a generation of messaging data that responds to additional message 192 within an augmented chatbot session.

By way of example, and as described herein, the unrelated inquiry may correspond to a balance inquiry associated with an investment account maintained on behalf of user 101 by the investment banking unit of the financial institution (e.g., "What's the current balance in my investment account?"). Using any of the exemplary processes described herein, response generation module 164 may access locally stored baseline session data 144, e.g., as maintained within the data records of session database 162, and extract a unique identifier of user 101 (e.g., the login credential of user 101, etc.) and/or a unique identifier of client device 102 (e.g., the IP address of client device 102). Response generation module 164 may also extract, from accessed baseline session data 144, a portion of contextual information 112B that characterizes the inquiry as a balance inquiry and that identifies locally maintained investment account data as a responsive data type or class.

In some instances, illustrated in FIG. 1B, response generation module 164 may access investment account database 163, e.g., as maintained within data repository 158, and identify one or more data records 163A that include or reference the unique identifier of user 101 or client device 102. For example, accessed data records 163A may include a current balance of the investment account held by user 101 (e.g., $121,375.00), and response generation module 164 may perform operations that extract the current balance from accessed data records 163. In other instances, accessed data records 163A may identify one or more sequentially ordered transactions involving user 101's investment account during one or more temporal intervals, and response generation module 164 may compute the current balance of the investment account based on the one or more sequentially ordered transactions within accessed data records 163A. Response generation module 164 may also perform operations that package the extracted or computed current balance of the investment account within the one or more elements of response data 166, along with additional portions of contextual information 112B that identify and characterize the balance inquiry and user 101's investment account.

In some exemplary embodiments, as described herein, response generation module 164 may generate all, or a portion, of response data 166 based a contextual analysis of additional message 192 performed by executed first chatbot engine 124, e.g., based on contextual information 112B derived from an application of one or more of the natural language processing techniques to textual data 110 by NLP engine 132 of executed first chatbot engine 124. In other exemplary embodiments, second chatbot engine 154 may also include one or more local natural language processing (NLP) modules (not illustrated in FIG. 1B), which, in response to a successful validation of authentication token 142 by security module 160, apply one or more of the natural language processing techniques described herein to all or a portion of textual data 110 included within baseline session data 144. Based on the application of these natural language processing algorithms, the one or more local NLP modules of second chatbot engine 154 may perform any of the exemplary processes described herein to identify the one or more discrete linguistic elements within textual data 110, and to generate local contextual information that establishes the context and meaning of combinations of the discrete linguistic elements within textual data 110, each of which may be provided as an input to response generation module 164.

Referring back to FIG. 1B, response generation module 164 may provide response data 166 as an input to a messaging module 168 of second chatbot engine 154. In some instances, when executed by second computing system 152, messaging module 168 may perform any of the exemplary processes described herein to generate a response message 170 that includes one or more selected portions of response data 166, is responsive to the unrelated inquiry, and when presented within chatbot interface 182, facilitates an ongoing and simulated conversation between user 101 and the chatbots generated or hosted programmatically by first chatbot engine 124 and by second chatbot engine 154 during an augmented chatbot session.

For example, response data 166 may indicate that the investment account held by user 101 is characterized by a current balance of $121,375.00, and may include additional information, e.g., metadata, that identifies the specified inquiry as a balance inquiry (e.g., the inquiry type) associated with the investment account held by user 101 (e.g., the subject of the inquiry). Messaging module 168 may parse response data 166 to extract the current balance $121,375.00 and the elements of metadata (e.g., that identify the inquiry type and the subject of the inquiry), and generate elements of textual content 174 that are consistent with extracted elements of metadata and identify the extracted current balance of the investment account. In some instances, when rendered for presentation within chatbot interface 182, the generated elements of textual content may correspond to, and represent, a response to the introductory message 190 within the ongoing and facilitated conversation between the between user 101 and the chatbots generated or hosted programmatically by first chatbot engine 124 and second chatbot engine 154, e.g., during the augmented chatbot session described herein.

In some instances, messaging module 168 may generate the elements of textual content 174 in accordance in accordance with one or more response templates and additionally, or alternatively, in accordance with one or more predetermined rules that specify appropriate response messages. For example, each of response templates or predetermined rules may be associated with a particular inquiry type (e.g., a balance inquiry, a credit inquiry, etc.) or a particular inquiry subject (e.g., an investment account, a credit card account, etc.), and second computing system 152 may maintain data identifying and specifying each of the response templates or predetermined rules within a corresponding portion of data repository 158, e.g., within template and rules data store 172.

For example, an upon receipt of response data 166, messaging module 168 may access template and rules data store 172 and extract template data 173 that specifies a response template consistent with the corresponding inquiry type (e.g., the balance inquiry) or the corresponding inquiry subject (e.g., the investment account of user 101). As described herein, the corresponding inquiry type and/or inquiry subject may be defined as metadata within response data 166, or in other examples, messaging module 168 may perform operations that extract the corresponding inquiry type and/or inquiry subject from portions of baseline session data 144 (e.g., from contextual information 112B) maintained within the data records of session database 162. The response template specified within template data 173 may, in some instances, include predetermined textual content associated with the response to the balance inquiry (or the investment account) along with placeholder textual content capable of population or replacement by messaging module 168 with corresponding portions of response data 166.

By way of example, the response template within template data 173 (e.g., corresponding to the balance inquiry) may specify predetermined and placeholder textual content that includes, but is not limited to "The current balance of your [[Inquiry Subject]] is [[Current Balance]]." In some instances, messaging module 168 may parse the response template to identify the elements of placeholder textual content, e.g., "[[Inquiry Subject]]" and "[[Current Balance]]," and may perform operations that generates populated template data by populating, or replacing, each of the elements of placeholder textual content within a corresponding portion of response data 166 or locally stored baseline session data 144.

For example, messaging module 168 may generate populated template data that replaces "[[Inquiry Subject]]" with textual content representative of the inquiry subject (e.g., "investment account" extracted from either response data 166 or from baseline session data 144), and that replaces "[[Current Balance]]" with textual content representative of the $121,375.00 current balance of the investment account (e.g., as extracted from response data 166), and the populated template data may specify textual content that includes, but is not limited to, "The current balance of your investment account is $121,375.00." In some instances, messaging module 168 may package the generated template data into a corresponding portion of response message 170, e.g., as textual content 174.

The disclosed exemplary embodiments are, however, not limited to processes that generate textual content 174 in accordance with one or more response templates or one or more predetermined rules. In other examples, not illustrated in FIG. 1B, messaging module 168 may generate dynamically all or a portion of textual content 174 based on an application of one or more machine learning processes, one or more artificial intelligence processes (e.g., a neural network model implemented through a distributed or cloud-based computing system), or one or more stochastic statistical models (e.g., a Markov process) to structured input that includes, but is not limited to, portions of textual data 110 (e.g., that defines the balance inquiry associated with user 101's investment account, as specified within additional message 192) and to portions of response data 166 (e.g., that specifies the $121,375.00 current balance of the investment account, etc.).

In some instances, the one or more machine learning processes, artificial intelligence processes, or stochastic statistical models may collectively establish a dynamic natural language generation (NLG) process that, when applied to any of the structured inputs described herein, dynamically generates textual content that responds to the inquiry specified within additional message 192 and further, mimics human-generated content during an ongoing conversation with user 101. The dynamic NLG model may be adaptively trained against, and improved using, selected elements of training data that include, but are not limited to, data characterizing prior chatbot or messaging sessions involving user 101, other users of second chatbot engine 154, and digitized or electronic copies of correspondence prepared by, or received by, user 101 or the other users. Further, and by way of example, the dynamic NLG model may be deemed trained when a quality or an accuracy of generated textual content satisfies a predetermined metric (e.g., the accuracy of the generated textual context exceeds a threshold accuracy, etc.), and messaging module 168 may generate dynamically all or a portion of textual content 174 based the application of the now-trained dynamic NLG model to one or more elements of the structured input data, as described herein.

As illustrated in FIG. 1B, messaging module 168 may perform operations that package the generated textual content 174 into a corresponding portion of response message 170. Messaging module 168 may also perform operations that package, into additional portions of response message 170, information that includes, but is not limited to: (i) session identifier 176 of the established chatbot session between chatbot application 104 (e.g., as executed by client device 102) and first chatbot engine 124 (e.g., as executed by first computing system 122), which messaging module 168 may extract from a corresponding portion of locally maintained baseline session data 144 (e.g., within the data records of session database 162); and (ii) data 178 that identifies or characterizes second chatbot engine 154 or second computing system 152, e.g., the investment banking unit of the financial institution that operates first computing system 122 and second computing system 152. In some instances, when processes by executed chatbot application 104, session identifier 176 and/or data 178 causes executed chatbot application 104 to establish a secure, programmatic channel of communications with executed second chatbot engine 154, and to instantiate an augmented chatbot session that facilitates an ongoing and simulated conversation between user 101, executed first chatbot engine 124, and executed chatbot engine 154. Messaging module 168 may perform operations that cause second computing system 152 to transmit response message 170 across communications network 120 to client device 102.

Referring to FIG. 1C, a programmatic interface associated with chatbot application 104, such as API 105, may receive and route response message 170 to a session augmentation module 116 of chatbot application 104. Upon execution by chatbot application 104, session augmentation module 116 may receive response message 170 and may perform operations that parse response message 170 to extract session identifier 176, which corresponds to the unique alphanumeric session identifier received by executed second chatbot engine 154 from executed first chatbot engine 124, e.g., as a portion of baseline session data 144. Further, session augmentation module 116 may also access local session data 115 and obtain a local session identifier 117, which corresponds to a copy of session identifier 176 received by executed chatbot application 104 from executed first chatbot engine 124 upon initiation of the existing chatbot session.

Session augmentation module 116 may perform operations that determine whether local session identifier 117 is consistent with, and corresponds to, extracted session identifier 176. If, for example, session augmentation module 116 were to detect an inconsistency between the local and extracted session identifiers, session augmentation module 116 may decline to establish a secure, programmatic channel of communications between executed chatbot application 104 and executed second chatbot engine 154, and may further decline to augment the existing chatbot session to include executed second chatbot engine 154. In some instances, however, executed chatbot application 104 may maintain the establish communications channel, and the established chatbot session, with executed first chatbot engine 124, and user 101 may continue to interact with executed first chatbot engine 124 during the established chatbot session via chatbot interface 182.

Alternatively, if session augmentation module 116 were to detect a consistency between local session identifier 117 and extracted session identifier 176, session augmentation module 116 may perform operations that establish the secure, programmatic channel of communications between executed chatbot application 104 and executed second chatbot engine 154, e.g., via API 105 of chatbot application 104 and API 156 of second chatbot engine 154. Further, and responsive to the established consistency, session augmentation module 116 may perform further operations that instantiate the augmented chatbot session that facilitates the ongoing and simulated conversation between user 101, executed first chatbot engine 124, and executed chatbot engine 154, and that renders and presents the response to the inquiry specified within additional message 192 on a portion of chatbot interface 182.

For example, and responsive to the responsive to the established consistency, session augmentation module 116 may provide response message 170 as an input to a chatbot interface module 118 of chatbot application 104. Upon execution by chatbot application 104, chatbot interface module 118 may perform operations that parse response message 170 to extract textual content 174, and that generate one or more interface elements 119 representative of textual content 174. In some instances, chatbot interface module 118 may provide interface elements 119 to a display unit of client device 102 (not illustrated in FIG. 1C), which may present interface elements 119 within a corresponding portion of chatbot interface 182 during the now-augmented chatbot session, e.g., as response 194 indicating that "The current balance of your investment account is $121,375.00."

As illustrated in FIG. 1C, executed chatbot application 104 may perform operations that cause the display unit to present introductory message 190 (e.g., as generated by executed first chatbot engine 124) and response 194 (e.g., as generated by executed second chatbot engine 154) on chatbot interface 182 without any identifiers of first chatbot engine 124 or second chatbot engine 154. As such, in some instances, user 101 may be unaware of the dynamic and programmatic augmentation of the established chatbot session to include both first chatbot engine 124 and second chatbot engine 154 based on a performance of the collective operations by chatbot application 104, first chatbot engine 124, and second chatbot engine 154.

In other instances, not illustrated in FIG. 1C, chatbot interface module 118 may perform operations that generate, and render for presentation within chatbot interface 182, additional interface elements that identify a corresponding chatbot that generated one or more of introductory message 190 or response 194, e.g., a corresponding one of executed first chatbot engine 124 or executed second chatbot engine 154. For example, these additional interface elements may include a first textual or graphical indicator of the retail banking unit of the financial institution, which may be presented within chatbot interface 182 in conjunction with, or in proximity to, introductory message 190 (e.g., as generated by first chatbot engine 124 associated with the retail banking unit), and a second textual of graphical indicator of the investment banking unit of the financial institution, which may be presented within chatbot interface 182 in conjunction with, or in proximity to, response 194 (e.g., as generated by second chatbot engine 154 associated with the investment banking unit). The disclosed embodiments are, however, not limited to these exemplary textual indicators and graphical indicators, and chatbot interface module 118 may perform operations that present any additional or alternate indicator in conjunction with a corresponding message that would be appropriate to identify an underlying chatbot, business unit, or financial institution, including audible or tactile indicators generated by client device 102.

In some exemplary embodiments, as described in reference to FIGS. 1A-1C, first computing system 122 and second computing system 152 may perform operations that augment an existing chatbot session between user 101 (e.g., via chatbot interface 182 generated by executed chatbot application 104) and a first chatbot programmatically generated and hosted by first computing system 122 (e.g., based on operations performed by executed first chatbot engine 124) to include a second chatbot programmatically generated and hosted by second computing system 152 (e.g., based on operations performed by executed second chatbot engine 154). As described herein, and based on a detected relationship between first computing system 122 and second computing system 152, executed second chatbot engine 154 may rely on a prior authentication of user 101 by executed first chatbot engine 124 to establish a secure, programmatic channel of communications with executed first chatbot engine 124, and to receive, across the established communications channel, session data characterizing an unrelated inquiry posed by user 101 during the existing chatbot session, e.g., to which executed first chatbot engine 124 may be incapable of responding.

Further, and based on the prior authentication of user 101 by executed first chatbot engine 124, executed second chatbot engine 154 may perform any of the exemplary processes described herein to generate a response to the inquiry based on locally accessible elements of sensitive customer, account, or transaction data associated with user 101, and to provision that response to executed chatbot application 104 for presentation within chatbot interface 182 during the augmented chatbot session, e.g., automatically and without further intervention from user 101. In some instances, certain of these exemplary embodiments may be implemented in addition to, or as an alternate to, token-based authentication and consent protocols, such as an OAuth protocol, which require an additional authentication of user 101, and a provision of consent by user 101, prior to establishing secure, programmatic communications between executed first chatbot engine 124 and executed second chatbot engine 154 (and between executed second chatbot engine 154 and executed chatbot application 104).

In other instances, the inquiry posed by user 101 may reference information available to one or more third-party computing systems unrelated to first computing system 122, second computing system 152, and further, to executed chatbot application 104 provisioned to client device 102 by first computing system 122. By way of example, and during the existing chatbot session between executed chatbot application 104 and executed first chatbot engine 124 (e.g., associated with the retail banking unit of the financial institution), user 101 may provide input to client device 102 that specifies a further inquiry associated with a product or service offered to user 101 by a third-party financial institution unrelated to the retail banking unit or investment banking unit of the financial institution (e.g., a third-party product or service). In some instances, first chatbot engine 124 may be incapable of generating a message responsive to the further inquiry, as first computing system 122 does not maintain data characterizing the third-party product or service. Further, executed first chatbot engine 124 may also be incapable of establishing a secure channel of communication with an executed chatbot engine associated with the third-party financial institution based on the prior authentication of user 101, as no relationship exists between first computing system 122 and a computing system associated with the third-party financial institution, e.g., a third-party computing system, which maintains elements of sensitive customer, account, or transaction data responsive to the further inquiry.

In some exemplary embodiments, described below in reference to FIGS. 2A-2C, executed chatbot engine 124 may perform operations that establish a secure channel of communications with the third-party computing system and initiate an augmentation of the established chatbot session to include a third-party chatbot engine executed by that third-party computing system based not on the prior authentication of user 101 during the established chatbot session, but instead based on data indicative of a successful outcome of one or more of the token-based authentication and consent processes described herein. Examples of these token-based authentication and consent processes include, but are not limited to, an OAuth protocol collectively implemented by application programs executed by client device 102, first computing system 122, and the third-party computing system, e.g., in response to an access request generated by executed first chatbot engine 124 and transmitted to a programmatic interface of the third-party chatbot engine.

In some instances, the access request may include, but is not limited to, data that uniquely identifies user 101 (e.g., a login credential, a digital identifier within an open-banking environment, etc.) or client device 102 (e.g., an IP address or a MAC address), along with additional data that uniquely identifies first computing system 122 or executed first chatbot engine 124 (e.g., an IP address of first computing system 122, an application cryptogram generated by or assigned to executed first chatbot engine 124, etc.). The access request may also include, but is not limited to, additional data that characterizes the requested access, such as session identifier 176 of the established chatbot session or information specifying the requested augmentation of the established chatbot session or data response to the further inquiry, e.g., the elements of sensitive customer, account, or transaction data maintained by the third-party computing system.

The receipt of the access request at the programmatic interface of the third-party chatbot engine may cause the third-party computing system to generate, and transmit a notification of the requested access (e.g., the access requested by executed first chatbot engine 124) to client device 102, e.g., across communications network 120 using any appropriate communications protocol. Client device 102 may receive the notification, and may execute one or more application programs (e.g., a third-party mobile application provisioned by the third-party computing system) that generate and present, on the display unit, a digital interface that prompts user 101 to provide or deny explicit consent to the requested access and to provide one or more appropriate login or authentication credentials that confirm the explicitly provided or denied consent. By way of example, client device 102 may execute the one or more applications, such as the third-party mobile application, in the background, and upon receipt of the notification, may perform operations that promote the executed third-party mobile application to the foreground for presentation of the digital interface. In other instances, the receipt of the notification may cause client device 102 to generate one or more programmatic commands to execute the one or more application programs, e.g., the third-party mobile application.

For example, the digital interface may include one or more interface elements that identify the type of access requested by executed first chatbot engine 124, such as, but not limited to, the augmentation of the existing chatbot session to include the third-party chatbot engine and/or the generation of messaging data based on the elements of sensitive customer, account, or transaction data by that third-party chatbot engine. Further, the digital interface may include one or more interface elements that prompt user 101 to provide or deny the requested consent (e.g., a selectable icon, a checkbox, etc.) and further, to input one or more authentication or login credentials that confirm the granted or denied consent, such as, but not limited to, an alphanumeric login credential, an alphanumeric password, or a biometric credential (e.g., a thumbprint scan, a facial image, etc.). In some instances, user 101 may provide, via the input unit, input to client device 102 that specifies the granted or denied consent and the one or more authentication credentials, and the executed third-party application may perform operations that authenticate an identity of user 101 based a comparison between the specified authentication credentials and locally maintained credential data. Responsive to a successful authentication of the identity of user 101, the executed third-party application may generate consent data indicative of the successful authentication of user 101's identity and the granted or denied consent, and client device 102 may transmit the consent data to the third-party computing system via the programmatic interface, e.g., across communications network 120 using any appropriate communications protocol.

The third-party computing system may receive the consent data, and may process the consent data to determine whether user 101 granted consent for the access requested by executed first chatbot engine 124. Based on the granted consent, the identified computing system may perform operations that generate a digital token, cryptogram, or other element of cryptographic data, e.g., an OAuth token, indicative of successful authentication of user 101's identity and the granted consent, and may store the OAuth token within one or more tangible, non-transitory memories, e.g., in conjunction with elements of the received request that identify first computing system 122 or executed first chatbot engine 124 (and additionally, or alternatively, session identifier 176 associated with the established chatbot session). In some instances, the OAuth token may be characterized by a predetermined structure or format recognizable by each of the participants in the OAuth process, such as first computing system 122, and the third-party computing system may perform operations that transmit the OAuth token across communications network 120 to first computing system 122, e.g., in response to the request generated by executed first chatbot engine 124.

First computing system 122 may receive the OAuth token, and may store the received OAuth token within one or more tangible, non-transitory memories, e.g., within the data records of relationship database 126C associated with the identified computing system. As described herein, the OAuth token may confirm an established permission of executed first chatbot engine 124 to access the programmatic interface associated with the third-party computing system, may confirm to the third-party chatbot engine that user 101 consented to the augmentation of the existing chatbot session, e.g., between executed first chatbot engine 124 and executed chatbot application 104, and to the exchange of sensitive customer, account, and transaction data during that augmented chatbot session. In some instances, described below in reference to FIGS. 2A-2C, executed first chatbot engine 124 and the executed third-party chatbot engine may perform any of the exemplary processes described herein to establish a secure, programmatic channel of communications based on the provisioned OAuth token, and to initiate the augmented chatbot sessions that include the third-party chatbot engine, which responds to the further inquiry based on elements of sensitive customer, account, or transaction data locally maintained at the third-party computing system (and in accessible to first computing system 122).

Figure 2A:
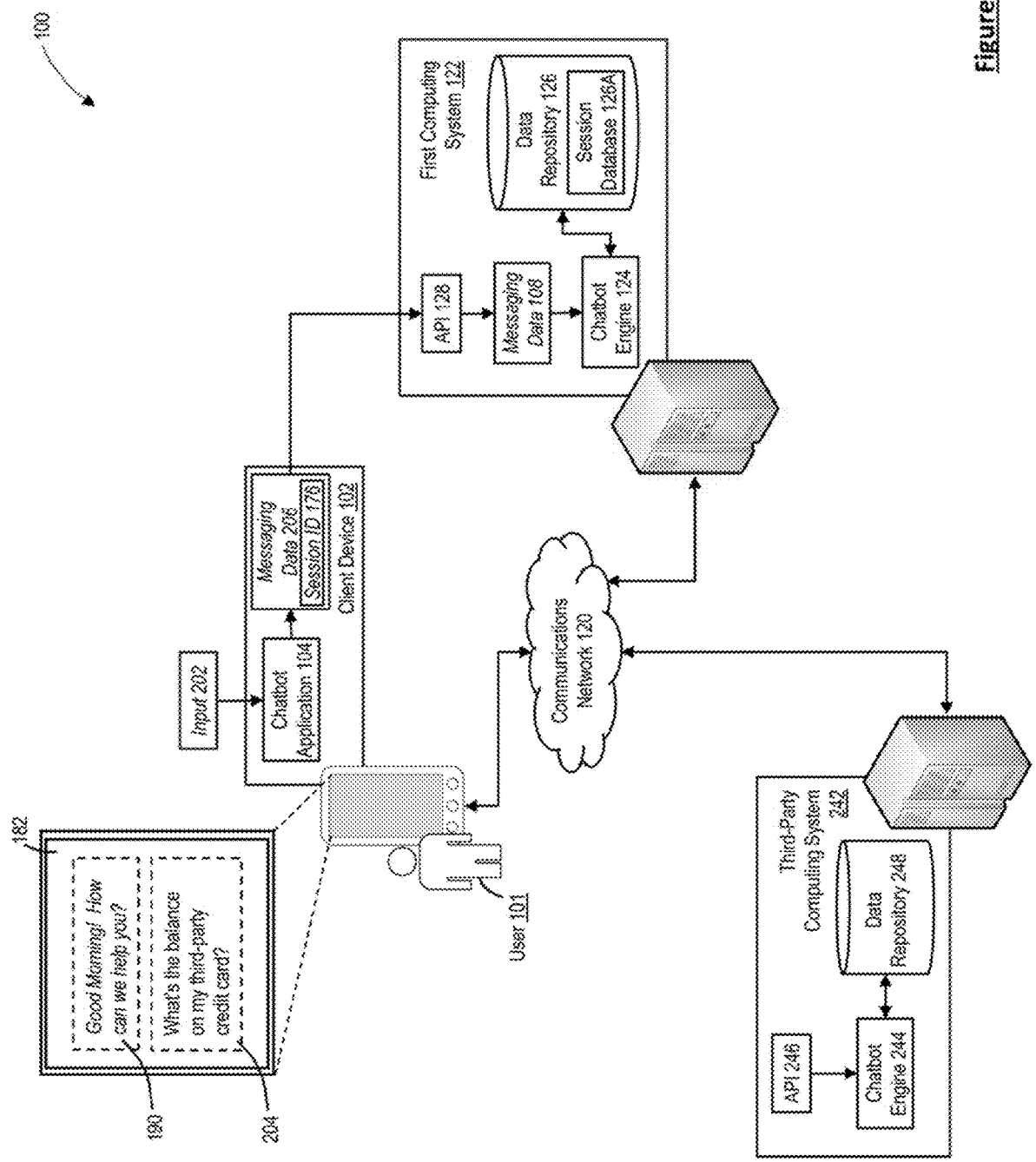

Referring to FIG. 2A, and in further response to the presentation of introductory message 190 within chatbot interface 182, user 101 may provide input 202 to client device 102 (e.g., via the corresponding input unit using any of the exemplary processes described herein) that specifies an additional inquiry unrelated to the products or services provided to user 101 by the retail banking unit of the financial institution. By way of example, and as described herein, the additional inquiry may include a balance inquiry associated with a credit card account issued to user 101 by a third-party financial institution unrelated to that financial institution (e.g., "What is the balance on my third-party credit card?").

Upon execution by client device 102, chatbot application 104 may receive input 202, and may perform any of the exemplary processes described herein to render input 202 for presentation as an additional message 204 within chatbot interface 182 on the corresponding display unit. Chatbot application 104 also may perform any of the exemplary processes described herein to package all, or a selected portion, of input 202 into corresponding portions of messaging data 206. In some instances, messaging data 206 may include textual content that specifies the additional unrelated inquiry, which chatbot application 104 may extract from, derive from, or generate on the basis of input 202, along with session identifier 176 and temporal data characterizing a time or date at which user 101 provided input 202 to client device 102.

As described herein, messaging data 206 may also include a unique identifier of user 101 (e.g., a login credential, a digital identifier, etc.), a unique identifier of client device 102 (e.g., an IP address, a MAC address, etc.) and additionally, or alternatively, an application cryptogram generated by executed chatbot application 104 (e., that uniquely identifies executed chatbot application 104). Executed chatbot application 104 may perform additional operations that cause client device 102 to transmit messaging data 206 across communications network 120 to first computing system 122, e.g., using any appropriate communications protocol.

First computing system 122 may receive messaging data 108 through a secure programmatic interface, such API 128 of executed chatbot engine 124, and executed first chatbot engine 124 may perform any of the exemplary processes described herein to verify received messaging data 206 is associated with, and was generated during, the established chatbot session, with executed chatbot application 104. In one instance, and in response to a failed verification of messaging data 206, executed first chatbot engine 124 may perform operations that discard received messaging data 206, terminate the established chatbot session, and generate and transmit and error message to client device 102, e.g., through API 128 (not illustrated in FIG. 2A).

In other instances, and responsive to a successful verification of messaging data 206, executed first chatbot engine 124 may perform operations that associate messaging data 206 with the established chatbot session and store received messaging data 206 within the one or more data records of session database 126A associated with the established chatbot session (e.g., that include or reference session identifier 176 of the established chatbot session), along with along with temporal data characterizing a time or date at which client device 102 generated messaging data 206, or at which first computing system 122 received messaging data 206.

Executed first chatbot engine 124 may also perform any of the exemplary processes described herein to identify and characterize one or more inquiries specifies within messaging data 206 (the balance inquiry related to the third-party credit card account issued to user 101 by the third-party financial institution), to identify a computing system that operates within environment 100 and is configured to, or capable of, accessing data responsive each of the inquiries and further, to augment the established chatbot session to include an additional chatbot engine that, when executed by that identified computing system, generates messaging data responsive to each of the identified inquiries.

Figure 2B:
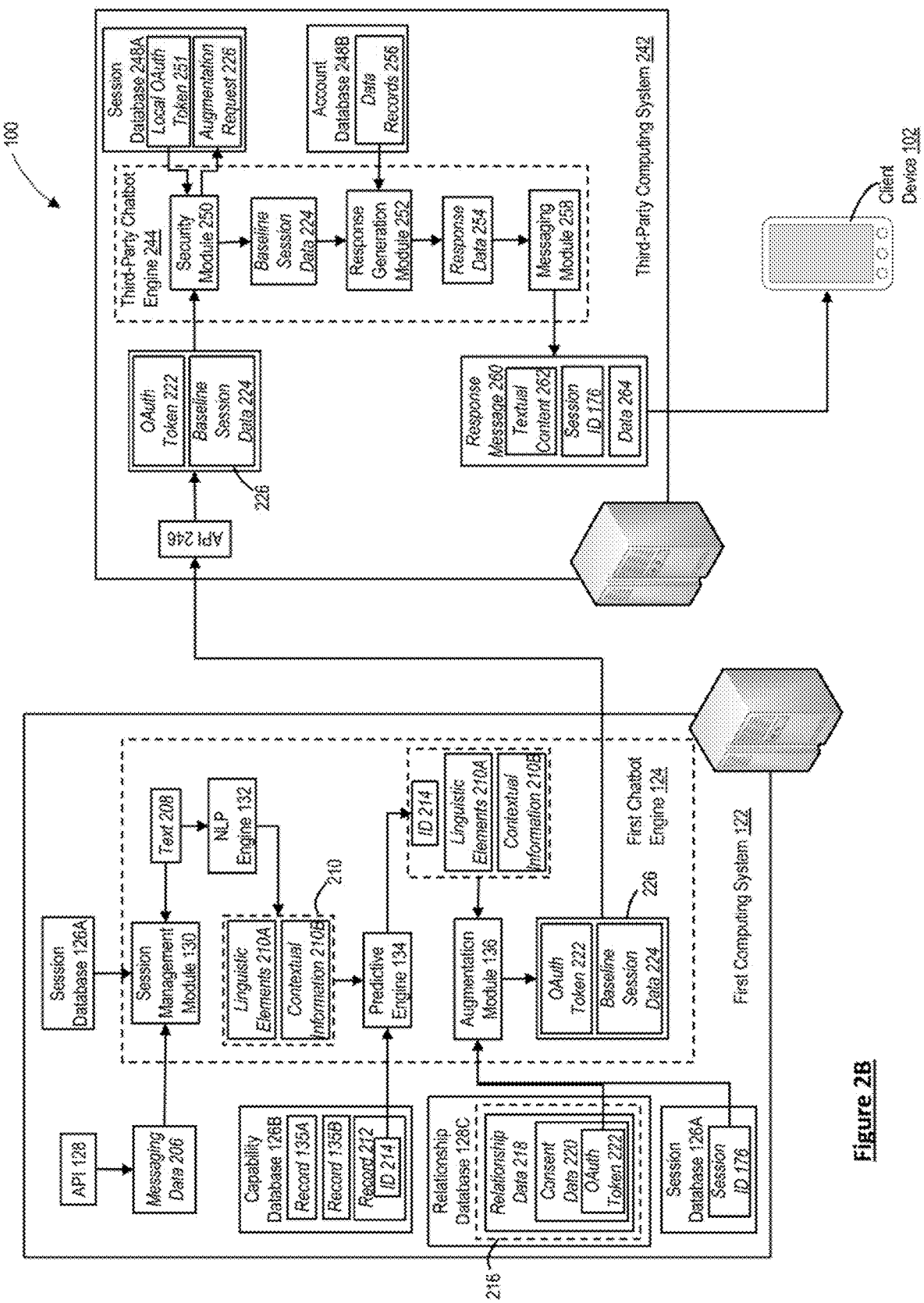

Referring to FIG. 2B, messaging data 206 may be routed to session management module 130 of executed first chatbot engine 124, which may perform operations that parse messaging data 108 to extract textual data 208 (e.g., representative of additional message 204, including "What is the balance on my third-party credit card?"). In some instances, session management module 130 may generate a programmatic command that executes a natural language processing (NLP) engine 132 of first chatbot engine 124, and as illustrated in FIG. 2B, session management module 130 may provide extracted textual data 208 as an input to executed NLP engine 132. In other instances, consistent with the disclosed exemplary embodiments, a functionality of session management module 130 may be performed by executed NLP engine 132, and API 128 may route received messaging data 206 directly to executed NLP engine 132, which may process messaging data 206 and extract textual data 208.

NLP engine 132 may receive textual data 208, and may apply one or more of the exemplary natural language processing techniques or processes to all, or a selected portion, of textual data 208. Based on the application of these natural language processing algorithms processes, NLP engine 132 may perform any of the exemplary processes described herein to identify one or more discrete linguistic elements (e.g., a word, a combination of morphemes, a single morpheme, etc.) within textual data 208, and establish a context and a meaning of combinations of the discrete linguistic elements, e.g., based on the identified discrete linguistic elements, relationships between these discrete linguistic elements, and relative positions of these discrete linguistic elements within textual data 208. In some instances, NLP engine 132 may generate output 210 that includes, but is not limited to, linguistic element data 210A and contextual information 210B.

As described herein, linguistic element data 210A may include each of the discrete linguistic elements identified within textual data 208 by NLP engine 132, along with position data characterizing a position or location of each of the discrete linguistic elements within textual data 208. Further, contextual information 210B may specify the established context or meaning of the combination of the discrete linguistic elements and in some instances may identify a product or service associated with or requested by additional message 204, e.g., as specified by the inquiry within textual data 208. Additionally, or alternatively, contextual information 112B may also identify one or more elements of data or types of data that, if accessible to first chatbot engine 124, would facilitate a local generation of a response to the inquiry.

By way of example, and as described herein, textual data 208 may be representative of additional message 204 displayed on chatbot interface 182 of FIG. 2A. Based on the application of the exemplary natural language processing algorithms described herein to textual data 110208 NLP engine 132 may parse textual data 110 and extract discrete linguistic elements (e.g., discrete words) that include, but are not limited to, "what," "is," "the," "balance," "on," "my," "third-party," "credit," and "card," each of which may be packaged into a corresponding portion of linguistic element data 210A. Based on any of these exemplary natural language processing algorithms described herein to the discrete linguistic elements, e.g., alone or in ordered combinations, NLP engine 132 may determine that additional message 204 corresponds to a balance inquiry (e.g., the particular service) involving a credit card account issued by the third-party financial institution and held by user 101 (e.g., the particular product), and further, a particular data type or class that facilitates a response to the balance inquiry (e.g., account data characterizing the third-party credit card account held by user 101). As described herein, the particular data type or data class, which resolves the balance inquiry, may be unavailable first computing system 122 and as such, unavailable to executed first chatbot engine 124.

NLP engine 132 may package data identifying the particular service, the particular product, and in some instances, the particular data type or data class (e.g., a "responsive" data type or data class) into corresponding portions of contextual information 210B, and NLP engine 132 may provide linguistic element data 210A and contextual information 210B as inputs to a predictive engine 134. In some instances, predictive engine 134 may be configured to accept input data having a particular structure or format (e.g., "encoded" input data), and NLP engine 132 may be configured to generate structured portions of linguistic element data 210A and contextual information 210B that are consistent with, and compatible with, the particular structure or format of the encoded input data. Upon execution by first computing system 122 (e.g., based on a programmatic command generated by executed first chatbot engine 124), predictive engine 134 may perform any of the exemplary processes described herein to determine a capability of first chatbot engine 124 to generate a response to additional message 204 based on locally accessible data, e.g., as maintained within data repository 126.

For example, contextual information 210B may specify that the inquiry within additional message 204 corresponds to a balance inquiry for a product (e.g., a credit card account) provided to user 101 by third-party financial institution unrelated to the financial institution (or business unit) that operates first computing system 122. Based on portions of contextual information 210B, predictive engine 134 may perform any of the exemplary processes described herein to establish that elements of data responsive to additional message 204 (e.g., account or transaction data associated with the third-party credit card account) are inaccessible to executed first chatbot engine 124, e.g., based on data record 135A of capability database 126B, or to executed second chatbot engine 154, e.g., based on data record 135B of capability database 126B. As such, predictive engine 134 may determine that executed first chatbot engine 124 and executed second chatbot engine 154 are each incapable of generating a response appropriate to the balance inquiry regarding the third-party credit card account.

Further, and using any of the exemplary processes described herein, predictive engine 134 may perform operations that identify an additional computing system that operates within environment 100 and that maintains the account or transaction data responsive to the balance inquiry associated with the third-party credit card account. As illustrated in FIG. 2B, predictive engine 134 may access the data records of capability database 126B, e.g., as maintained within data repository 126, and identify one or more data records, such as data record 212, that include or reference the unrelated product or service associated with the additional message 204 (e.g., the balance inquiry associated with the third-party credit card account), the third-party financial institution that provides the unrelated products or services, or the elements of data responsive to additional message 204 (e.g., account or transactional data associated with the third-party credit card account). In some instances, and as described herein, predictive engine 134 may extract information identifying the unrelated product or service, the third-party financial institution or business entity that provides the unrelated products or services and additionally, or alternatively, the elements of responsive data from corresponding portions of contextual information 210B.

By way of example, and based on data record 212, predictive engine 134 may determine that a third party computing system 242 operating within environment 100 locally maintains account or transaction data characterizing the credit card account held by user 101 and issued by the third-party financial institution (e.g., the third-party credit card account) and as such, that a chatbot engine executed by third-party computing system 242 (e.g., third-party chatbot engine 244) is capable of responding to the balance inquiry specified within additional message 204. In some instances, third-party computing system 242 may be associated with, or operated by, the unrelated, third-party financial institution that issues the third-party credit card account to user 101, and may maintain, or may access (e.g., within a cloud-based repository), elements of sensitive customer, account, or transaction data that enable third-party chatbot engine 244 to generate a response appropriate to the balance inquiry specified within additional message 204.

For instance, third-party computing system 242 may represent a computing system that includes one or more servers and tangible, non-transitory memory devices storing executable code and application modules, such as, but not limited to, third-party chatbot engine 244. As described herein, the one or more servers may each include one or more processors, which may be configured to execute portions of the stored code or application modules to perform operations consistent with the disclosed embodiments. In some instances, third-party computing system 242 may can be incorporated into a single computing system, although in other instances, third-party computing system 242 can correspond to a distributed system that includes computing components distributed across one or more communications networks, such as those described herein, or those provided or maintained by cloud-service providers (e.g., Google Cloud™, Microsoft Azure™, etc.). The disclosed embodiments are, however, not limited to these exemplary distributed systems, and in other instances, third-party computing system 242 may include computing components disposed within any additional or alternate number or type of computing systems or across any appropriate network.

Referring back to FIG. 2B, predictive engine 134 may parse data record 212 and extract a unique system identifier 214 of third-party computing system 242, such as an IP address or a MAC address, and provide extracted system identifier 214 (and linguistic element data 210A and contextual information 210B), as inputs to augmentation module 136. When executed (e.g., via a programmatic command generated by first chatbot engine 124), augmentation module 136 may perform any of the exemplary processes described herein to augment the established chatbot session to include third-party chatbot engine 244 that, when executed by third-party computing system 242, generates messaging data responsive to the inquiry specified within additional message 204 for provisioning within chatbot interface 182.

Executed augmentation module 136 may receive system identifier 214, along with linguistic element data 210A and contextual information 210B, and may perform any of the exemplary processes described herein to establish an existence of a relationship, or a lack thereof, between first computing system 122 and third-party computing system 242. For example, and as described herein, augmentation module 136 may parse the data records of relationship database 126C, and identify a corresponding one of the data records, e.g., data record 216, that includes or references system identifier 214. Augmentation module 136 may process data record 216 to access and extract relationship data 218, which characterizes the existence and/or scope of the relationship between first computing system 122 and third-party computing system 242. Further, and based on all or a portion of relationship data 218, augmentation module 136 may establish the existence, or lack thereof, of the relationship between first computing system 122 and third-party computing system 242.

By way of example, first computing system 122 may be associated with or operated by a financial institution that provides retail and investment banking services to user 101, and third-party computing system 242 may be associated with or operated by a third-party financial institution that issued a credit card account to user 101. As such, extracted relationship data 218 may specify that none of the exemplary relationships described herein exist between first computing system 122 and third-party computing system 242, and augmentation module 136 may establish that first computing system 122 and third-party computing system 242 are unrelated, and that third-party computing system 242 is incapable of relying on the prior authentication of user 101 by first computing system 122 during any augmentation of the established chatbot session between chatbot application 104 and first chatbot engine 124 upon.

Responsive to the absence of the relationship, augmentation module 136 may further parse relationship data 218 to establish a presence, or lack, or consent data 220 indicative of a successful outcome of one or more of the token-based authentication and consent processes described herein, such as, but not limited to, an OAuth protocol collectively implemented by application programs executed by client device 102, first computing system 122, and third-party computing system 242. By way of example, consent data 220 may include a digital token, cryptogram, hash value, or other element of cryptographic data, such as OAuth token 222, which may be indicative of a successful authentication of the identity of user 101 during the implemented OAuth protocol. Further, and as described herein, OAuth token 222 may also confirm that user 101 not only granted executed first chatbot engine 124 permission to access a programmatic interface associated with third-party chatbot engine 244, but also consented to an augmentation of the established chatbot session to include third-party chatbot engine 244 and to a provisioning of message data that includes elements of sensitive customer, account, or transaction data maintained by third-party computing system 242 during the augmented chatbot session, e.g., in response to an augmentation request programmatically generated by executed first chatbot engine 124. As described herein, one or more application programs executed by third-party computing system 242 may generate OAuth token 222 in response the successful outcome of the implemented OAuth protocols, and may provision OAuth token 222 to first computing system 122, e.g., for storage within data record 218.

As illustrated in FIG. 2B, augmentation module 136 may parse relationship data 218 and detect a presence of OAuth token 222 (e.g., within consent data 220), which indicates the successful outcome of the authentication and consent processes of the OAuth protocol collectively implemented by application programs executed by client device 102, first computing system 122, and third-party computing system 242. Augmentation module 136 may also perform operations that generate elements of data, e.g., baseline session data 224, that identify and characterize the on-going chatbot session established between chatbot application 104 (e.g., as executed by client device 102) and first chatbot engine 124 (e.g., as executed by first computing system 122). For example, the generated elements of baseline session data 224 may include, but are not limited to: session identifier 176; information that uniquely identifies client device 102 and/or executed chatbot application 104 (e.g., a network address of client device 102, such as an IP address, an identifier or address of a programmatic interface of executed chatbot application 104, etc.); raw message data characterizing the inquiry specified within additional message 204 (e.g., a portion of textual data 208); and additionally, or alternatively, portions of linguistic element data 210A and contextual information 210B, which specify the discrete linguistic elements included within additional message 204 and the established context or meaning of the combination of the discrete linguistic elements. In some instances, augmentation module 136 may perform operations that package OAuth token 222 and baseline session data 224 into corresponding portions of an augmentation request 226, which first computing system 122 may transmit to third-party computing system 242 across communications network 120, e.g., using any appropriate communications protocol.

In other instances, not illustrated in FIG. 2B, augmentation module 136 may not detect OAuth token 222, or another element of consent data 220, within a portion of relationship data 218. Responsive to the absence of OAuth token 222, or to the lack of other elements of consent data 220, augmentation module 136 may perform operations that, either alone or in conjunction with other application programs executed by first computing system 122, generate an access request to initiate the one or more token-based authentication and consent processes described herein, such as the OAuth protocol. The access request may, for example, include data that uniquely identifies user 101 (e.g., a login credential, a digital identifier within an open-banking environment, etc.) or client device 102 (e.g., an IP address or a MAC address), along with additional data that uniquely identifies first computing system 122 or executed first chatbot engine 124 (e.g., an IP address of first computing system 122, an application cryptogram generated by or assigned to executed first chatbot engine 124, etc.). The access request may also include, but is not limited to, additional data that characterizes the requested access, such as session identifier 176 of the existing chatbot session or information specifying the requested augmentation of the existing chatbot session or data response to the additional inquiry, e.g., the elements of sensitive customer, account, or transaction data maintained by third-party computing system 242.

First computing system 122 may transmit the access request across communications network 120 to a programmatic interface associated with third-party chatbot engine 244 (not illustrated in FIG. 2B). The receipt of the access request at the programmatic interface of third-party chatbot engine 244 may cause third-party computing system 242 to perform operations that, in conjunction with one or more application programs executed by client device 102, implement the requested, token-based authentication and consent processes, such as the OAuth protocol (not illustrated in FIG. 2B). As described herein, and based on a successful outcome of the requested token-based authentication and consent processes (e.g., the OAuth protocol), third-party computing system 242 may generate elements of consent data 220, such as, but not limited to, OAuth token 222, which confirms the successful authentication of the identity of user 101, that user 101 granted executed first chatbot engine 124 permission to access a programmatic interface associated with third-party chatbot engine 244, and that user 101 consented to the augmentation of the established chatbot session to include third-party chatbot engine 244 and to the provisioning of message data that includes elements of sensitive customer, account, or transaction data maintained by third-party computing system 242 during the augmented chatbot session.

In some instances, not illustrated in FIG. 2B, third-party computing system 242 may transmit OAuth token 222 (or the elements of consent data 220) across communications network 120 to first computing system 122, which may store OAuth token 222 (or the elements of consent data 220) within a corresponding portion of relationship data 218. As described herein, augmentation module 136 may package OAuth token 222 (or the elements of consent data 220) and baseline session data 224 into corresponding portions of augmentation request 226, which first computing system 122 may transmit to the programmatic interface of third-party chatbot engine 244, e.g., across communications network 120 using any appropriate communications protocol.

Referring back to FIG. 2B, the programmatic interface of third-party chatbot engine 244, e.g., application programming interface (API) 246, may receive augmentation request 226. In some instances, API 246 may parse augmentation request 226 and determine whether a structure or composition of OAuth token 222 (or other elements of consent data 220) is consistent with, or corresponds to, a predetermined token structure or composition (e.g., an "expected" token structure or composition). In some instances, second computing system 152 may store data characterizing the expected token structure or composition within one or more tangible, non-transitory memories, e.g., within a portion of a data repository 248 accessible to API 246 and third-party chatbot engine 244.

If, for example, API 246 were to detect an inconsistency between the expected token structure or composition and the structure or composition of OAuth token 222 (or the other elements of consent data 220), API 246 may decline to establish communications with executed first chatbot engine 124, and third-party computing system 242 may generate and transmit an error message indicative of the detected inconsistency to first computing system 122, e.g., across communications network 120 using any appropriate communications protocol. In other instances, if API 246 were to establish a consistency between the expected token structure or composition and the structure or composition of OAuth token 222 (or the other elements of consent data 220), API 246 may establish that first chatbot engine 124 is permitted to access third-party chatbot engine 244, and may establish secure, programmatic communications between first chatbot engine 124 (e.g., as executed by first computing system 122) and third-party chatbot engine 244 (e.g., as executed by third-party computing system 242).

Response to the established permission, API 246 may route augmentation request 226 to a security module 250 of third-party chatbot engine 244, which may perform operations that validate OAuth token 222 (or the other elements of consent data 220). By way of example, when executed by third-party computing system 242 (e.g., based one or more commands programmatically generated by executed third-party chatbot engine 244), security module 250 may perform operations that compare OAuth token 222 against a local OAuth token 251 maintained within the one or more tangible, non-transitory memories, e.g., within session database 248A of data repository 248. In some instance, local OAuth token 251 may be associated with, or linked to, the unique identifier of user 101, client device 102, first computing system 122, and/or first chatbot engine 124, portions of which may be included within baseline session data 224.

If security module 250 were to detect an inconsistency between OAuth token 222 and local OAuth token 251, security module 250 may decline to augment the existing chatbot session between executed chatbot application 104 and executed first chatbot engine 124. Responsive to the detected inconsistency, executed third-party chatbot engine 244 may generate and transmit an error message indicative of the failed augmentation process to first computing system 122, which may cause executed first chatbot engine 124 to perform any of the exemplary processes described herein to select another computing system capable of responding to the inquiry specified within additional message 192 and/or to prompt user 101 to obtain information responsive to the inquiry through out-of-session channels.

Alternatively, if security module 250 were to establish a consistency between OAuth token 222 and local OAuth token 251, security module 250 may validate OAuth token 222 and rely on the confirmed authentication and consent (e.g., as indicated by now-validated OAuth token 222) when establishing a secure, programmatic communications session with chatbot application 104 executed by client device 102. In response to the successful validation of OAuth token 222, executed third-party chatbot engine 244 may perform operations that establish a handshake between API 246 and a communications interface of client device 102, which facilitates secure, programmatic communications and exchanges of data between third-party chatbot engine 244 and chatbot application 104, and which augments the existing chatbot session to include messaging data generated by third-party chatbot engine 244.

Security module 250 may also perform operations that store augmentation request 226, including baseline session data 224, within one or more data records of session database 248A associated with the existing chatbot session and now-validated OAuth token 222. Further, and responsive to the validation of OAuth token 222, security module 250 may extract baseline session data 224 from augmentation request 226, and may route baseline session data 224 to one or more additional application modules of third-party chatbot engine 244 which, upon execution, perform any of the exemplary processes described herein to generate a response to the inquiry specified within additional message 204 (e.g., the request for the balance of the third-party credit card account) based on portions of baseline session data 224, to programmatically augment the established chatbot session between executed chatbot application 104 and executed first chatbot engine 124 to include third-party chatbot engine 244, and to provision the provision the generated response for presentation within chatbot interface 182 during the augmented chatbot session.

By way of example, as illustrated in FIG. 2B, security module 250 may route baseline session data 224 to a response generation module 252 of third-party chatbot engine 244. As described herein, baseline session data 224 may include a unique identifier of user 101 (e.g., a login credential, etc.), client device 102 (e.g., a network address, such as an IP address, etc.), or chatbot application 104 (e.g., an address of a corresponding programmatic interface, etc.) associated with additional message 192. Further, as also described herein, baseline session data 224 may also associate each of the unique identifiers with additional information that characterizes the inquiry specified within additional message 204, such as, but not limited to, all or a portion of textual data 208, linguistic element data 210A and additionally, or alternatively, contextual information 210B.

When executed by third-party chatbot engine 244 (e.g., based on one or more programmatically generated commands), response generation module 252 may parse baseline session data 144 to extract one or more of the unique identifiers of user 101, client device 102, and/or executed chatbot application 104, and all or a portion of contextual data 210B, which characterizes the inquiry associated with additional message 204, the product or service specified by that inquiry, and further, specific elements would facilitate a generation of a response to the inquiry. In some instances, response generation module 252 may access one or more elements of the sensitive customer, account, or transaction data (e.g., as maintained within data repository 248) that are consistent with the extracted identifiers and the extracted portion of contextual information 210B, and based on the accessed customer, account, or transaction data, perform any of the exemplary processes described herein to generate a response to the inquiry specified within additional message 204 and package the generated response into one or more elements of response data 254.

Further, in some examples, response generation module 252 may also package, into the one or more elements of response data 254, certain portions of baseline session data 224 that identify and characterize the inquiry, such as, but not limited to, an inquiry type (e.g., the balance inquiry specified within contextual information 210B) and a subject of the inquiry (e.g., the third-party credit card account held by user 101, as specified within contextual information 210B). In some instances, the packaged portions of baseline session data 224 may correspond to metadata that, when associated with the generated response within the one or more elements of response data 254, further describes or characterizes the generated response and facilitates a generation of messaging data that responds to additional message 204 within an augmented chatbot session, as described herein.

As described herein, the inquiry specified within additional message 204 may correspond to a balance inquiry regarding a third-party credit card account issued by the third-party financial institution to user 101 (e.g., "What is the balance on my third-party credit card?"). Using any of the exemplary processes described herein, response generation module 252 may access locally stored baseline session data 224, e.g., as maintained within the data records of session database 248A, and extract a unique identifier of user 101 (e.g., the login credential of user 101, etc.) and/or a unique identifier of client device 102 (e.g., the IP address of client device 102). Response generation module 252 may also extract, from accessed baseline session data 224, a portion of contextual information 210B that characterizes the inquiry as a balance inquiry and that identifies locally maintained cred-card account data as facilitating a response to the balance inquiry.

In some instances, illustrated in FIG. 2B, response generation module 164 may access account database 248B, e.g., as maintained within data repository 248, and identify one or more data records 256 that include or reference the unique identifier of user 101 or client device 102. For example, accessed data records 256 may include a current balance of the third-party credit card account held by user 101 (e.g., $1,375.00), and response generation module 252 may perform operations that extract the current balance from accessed data records 256. In other instances, accessed data records 256 may identify one or more sequentially ordered transactions involving the third-party credit card account during one or more temporal intervals, and response generation module 252 may compute the current balance of the investment account based on the one or more sequentially ordered transactions within accessed data records 256. Response generation module 164 may also perform operations that package the extracted or computed current balance of the third-party credit card account within the one or more elements of response data 254, along with additional portions of contextual information 210B that identify and characterize the balance inquiry and the third-party credit card account.

As described herein, response generation module 252 may generate all, or a portion, of response data 254 based a contextual analysis of additional message 204 performed by executed first chatbot engine 124, e.g., based on contextual information 210B derived from an application of one or more of the natural language processing techniques to textual data 110 by NLP engine 132 of executed first chatbot engine 124. In other exemplary embodiments, third-party chatbot engine 244 may also include one or more local natural language processing (NLP) modules (not illustrated in FIG. 2B), which, in response to a successful validation of OAuth token 222, apply one or more of the natural language processing (NLP) processes or algorithms described herein to all or a portion of textual data 208 included within baseline session data 224. Based on the application of these NLP processes or algorithms, the one or more local NLP modules of third-party chatbot engine 244 may perform any of the exemplary processes described herein to identify the one or more discrete linguistic elements within textual data 208, and to generate local contextual information that establishes the context and meaning of combinations of the discrete linguistic elements within textual data 208, each of which may be provided as inputs to response generation module 252.

Referring back to FIG. 2B, response generation module 252 may provide response data 254 as an input to a messaging module 258 of third-party chatbot engine 244. In some instances, messaging module 258 may perform any of the exemplary processes described herein to generate a response message 260 that includes one or more selected portions of response data 254, is responsive to the inquiry specified within additional message 204, and when presented within chatbot interface 182, facilitates an ongoing and simulated conversation between user 101 and the chatbot generated or hosted programmatically by first chatbot engine 124 and third-party chatbot engine 244 during the augmented chatbot session.

For example, response message 260 may indicate that the third-party credit card account is characterized by a current balance of $1,375.00, and may include additional information, e.g., metadata, that identifies the specified inquiry as a balance inquiry (e.g., the inquiry type) associated with the third-party credit card account held by user 101 (e.g., the subject of the inquiry). Messaging module 258 may parse response data 254 to extract the current balance $1,375.00 and the elements of metadata (e.g., that identify the inquiry type and the subject of the inquiry). Further, using any of the exemplary text or message generation processes described herein, messaging module 258 may generate elements of textual content 262 that are consistent with extracted elements of metadata and identify the extracted current balance of the third-party credit card account. In some instances, when rendered for presentation within chatbot interface 182, the generated elements of textual content may correspond to, and represent, a response to the additional message 204 within the ongoing and facilitated conversation between the between user 101 and the chatbots generated or hosted programmatically by first chatbot engine 124 and third-party chatbot engine 244, e.g., during the augmented chatbot session described herein.

As illustrated in FIG. 2B, messaging module 258 may perform operations that package textual content 262 into a corresponding portion of response message 260. Messaging module 2858 may also perform operations that package, into additional portions of response message 260, information that includes, but is not limited to session identifier 176, which messaging module 258 may extract from a corresponding portion of locally maintained baseline session data 224 (e.g., within the data records of session database 248A), and data 264 that identifies or characterizes third-party chatbot engine 244 or third-party computing system 242. In some instances, when processed by executed chatbot application 104, session identifier 176 and/or data 264 causes executed chatbot application 104 to establish a secure, programmatic channel of communications with executed third-party chatbot engine 244, and to instantiate an augmented chatbot session that facilitates an ongoing and simulated conversation between user 101, executed first chatbot engine 124, and executed third-party chatbot session 244. Messaging module 258 may perform operations that cause third-party computing system 242 to transmit response message 260 across communications network 120 to client device 102.

Figure 2C:
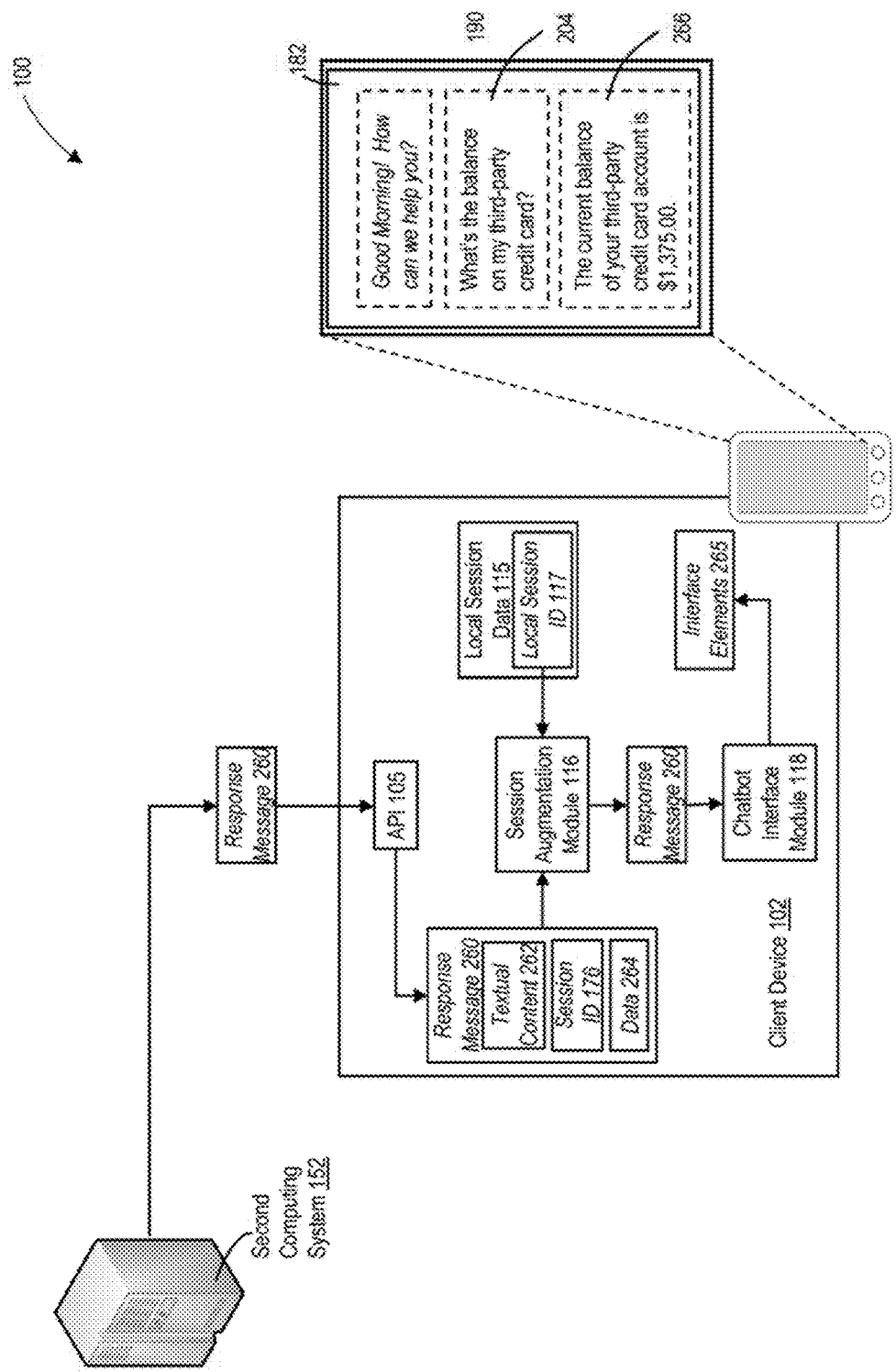

Referring to FIG. 2C, client device 102 may receive response message 260, and API 105 may route response message 260 to session augmentation module 116 of chatbot application 104. Upon execution by chatbot application 104, session augmentation module 116 may receive response message 260 and may perform operations that parse response message 260 to extract session identifier 176 and that access local session data 115 and obtain local session identifier 117. As described herein, local session identifier 117 which corresponds to the unique alphanumeric session identifier received by executed chatbot application 104 from executed first chatbot engine 124 upon initiation of the established chatbot session.

Session augmentation module 116 may perform operations that determine whether local session identifier 117 is consistent with, and corresponds to, extracted session identifier 176. If, for example, session augmentation module 116 were to detect an inconsistency between local session identifier 117 and extracted session identifier 176, session augmentation module 116 may decline to establish a secure, programmatic channel of communications between executed chatbot application 104 and executed third-party chatbot engine 244, and may further decline to augment the existing chatbot session to include third-party chatbot engine 244. Alternatively, if session augmentation module 116 were to establish a consistency between local session identifier 117 and extracted session identifier 176, session augmentation module 116 may perform any of the exemplary processes described herein to establish the secure, programmatic channel of communications between executed chatbot application 104 and executed third-party chatbot engine 244 (e.g., via API 105 of executed chatbot application 104 and API 246 of executed third-party chatbot engine 244), and to instantiate the augmented chatbot session that facilitates the ongoing and simulated conversation between user 101, executed first chatbot engine 124, and executed third-party chatbot session 244.

For example, and responsive to the established consistency, session augmentation module 116 may provide response message 260 as an input to chatbot interface module 118, which may perform any of the exemplary processes described herein to extract textual content 262 from response message 260, and to generate one or more interface elements 265 representative of textual content 262. In some instances, chatbot interface module 118 may provide interface elements 265 to a display unit of client device 102 (not illustrated in FIG. 2C), which may present interface elements 265 within a corresponding portion of chatbot interface 182 during the now-augmented chatbot session, e.g., as response 266 indicating that "The current balance of your third-party credit card account is $1,375.00."

Figure 3:
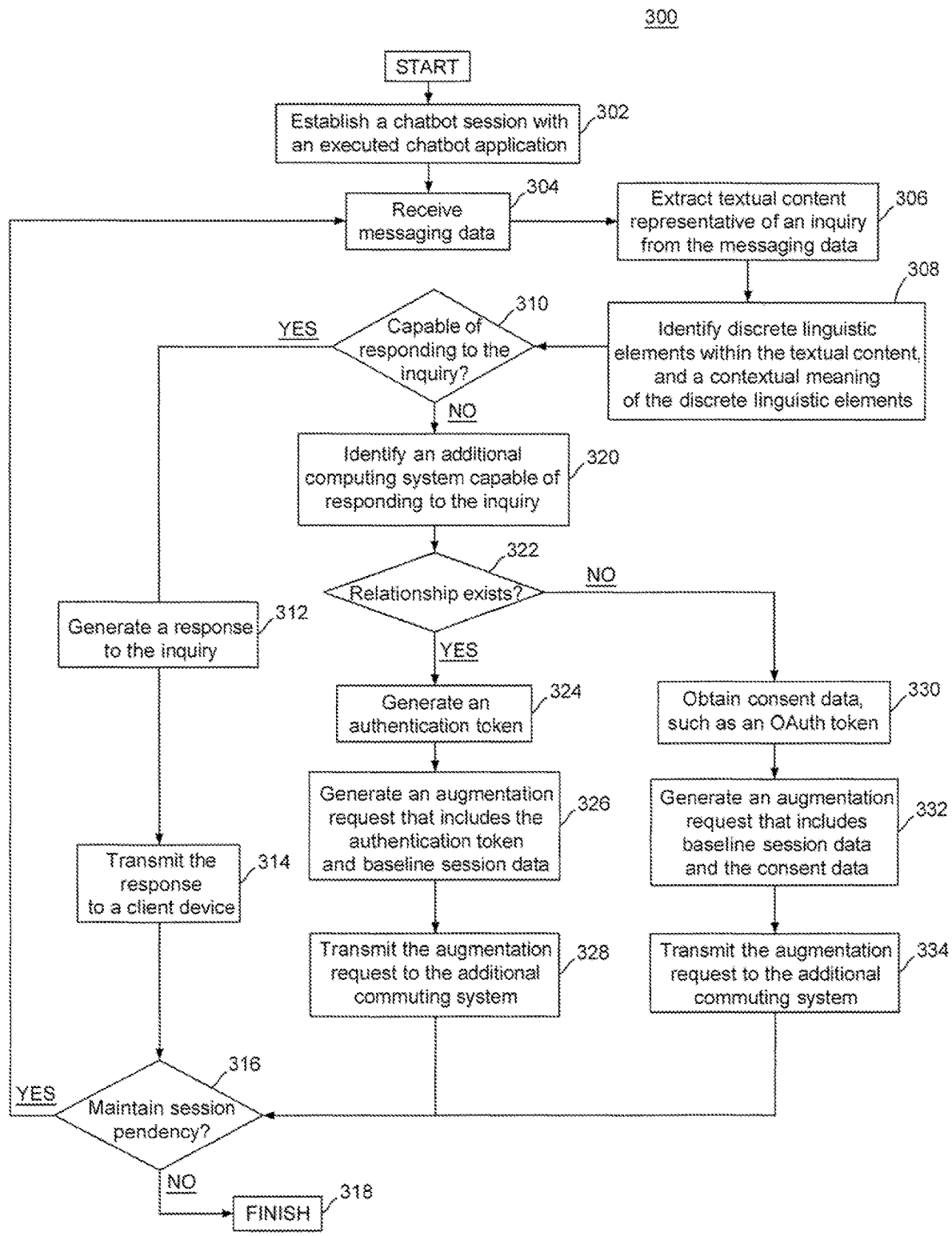
FIGS. 3 and 4 are flowcharts of an exemplary processes for a dynamically augmenting a programmatically generated chatbot session, in accordance with some exemplary embodiments.

FIG. 3 is a flowchart of an exemplary process 300 for dynamically augmenting and cryptographically secure augmentation of a programmatically generated chatbot session, in accordance with the disclosed embodiments. In some examples, a network-connected computing system, such as first computing system 122 of FIGS. 1A-1C and 2A-2C, may perform one or more of the exemplary steps of process 300, which establish a secure, programmatic communication session (e.g., a chatbot session) with a chatbot application executed by a network-connected device, such as client device 102 of FIGS. 1A-1C and 2A-2C, and which dynamically augment that established chatbot session based on secure, programmatic communications established initiated with application programs executed by one or more additional network-connected computing systems, such as second chatbot engine 154 executed by second computing system 152 of FIGS. 1A-1C or third-party chatbot engine 244 executed by third-party computing system 242 of FIGS. 2A-2C.

Referring to FIG. 3, first computing system 122 may perform operations that establish a secure, programmatic communications session, e.g., a chatbot session, with the chatbot application executed at client device 102 (e.g., in step 302). By way of example, and as described herein, first computing system 122 may receive a request to initiate the chatbot session from the executed chatbot application, e.g., executed chatbot application 104. Based on portions of the received request, first computing system 122 may perform any of the exemplary processes described herein to verify an authenticity of the request and further, to confirm a prior authentication of an identity of user 101 by client device 102. In response to a successful outcome of these exemplary verification and confirmation operations, first computing system may perform any of the exemplary processes described herein to initiate the chatbot session with executed chatbot application 104, and to generate and transmit an initial, introductory message across a corresponding communications network to client device 102. As described herein, executed chatbot application 104 may perform operations that present interface elements representative of the initial, introductory message within a digital interface associated with the now-established chatbot session, e.g., chatbot interface 182.

In some instances, first computing system 122 may receive messaging data generated by executed chatbot application 104 during the established chatbot session (e.g., in step 304). As described herein, executed chatbot application may generate the messaging data based on input provided to client device 102 by user 101, e.g., via a corresponding input unit and in response to a presentation of the initial, introductory message within chatbot interface 182. For example, the input provided by user 101 may include an inquiry posed by user 101 during the existing chatbot session, the inquiry may reference a product or service provided or offered by the financial institution associated first computing system 122, a business unit of that financial institution, one or more related financial institutions or business entities, or a third-party financial institution unrelated to the first computing system 122.

As described herein, the one or more received elements of messaging data may include textual content that characterizes the inquiry, along with a unique identifier of one or more of user 101 (e.g., an alphanumeric authentication credential, a digital identifier, etc.), of client device 102 (e.g., a network address, such as an IP address, a MAC address, etc.), or of executed chatbot application 104 (e.g., an application cryptogram, etc.). In some instances, first computing system 122 may parse the one or more received elements of messaging data to extract the textual content representative of the inquiry (e.g., in step 306). First computing system 122 may also perform operations that apply one or more of the NLP algorithms or processes described herein to all, or a selected portion, of the extracted textual content (e.g., in step 308). Further, and based on the application of the one or more NLP algorithms or processes, first computing system 122 may perform any of the exemplary processes described herein to identify one or more discrete linguistic elements (e.g., a word, a combination of morphemes, a single morpheme, etc.) within the extracted textual data, and to establish a context and a meaning of combinations of the discrete linguistic elements (e.g., also in step 308).

As described herein, the established context or meaning of the combination of the discrete linguistic elements may, for example, identify a product or service associated with or requested by the one or more elements of received messaging data, e.g., as specified by the inquiry within extracted textual content, and additionally, or alternatively, may identify a particular data type or data class that would be responsive to that inquiry, e.g., a responsive data type or class. In some instances, and based on a portion of the discrete linguistic elements, on information characterizing the identified product or service and additionally, or alternatively, on information characterizing the responsive data type or class, first computing system 122 may perform any of the exemplary processes described herein to determine its capability to generate a response to the messaging data based on locally accessible data (e.g., in step 310).

By way of example, and as described herein, first computing system 122 may be associated with, or operated by, a financial institution (or a particular business unit of that financial institution, such as a retail banking unit) that provides certain products or related services to user 101, and as such, may maintain sensitive customer, account, or transaction data that characterizes the provided products or related services within one or more tangible, non-transitory memories. In some instances, in step 310, first computing system 122 may perform any of the exemplary processes described herein to determine that first computing system 122 provides the product or service identified within the messaging data, or that the locally maintained elements of sensitive customer, account, or transaction data correspond to the responsive data type or data class. Responsive to this determination, first computing system 122 may establish in step 310 the capability to generate the response to the messaging data based on the locally maintained or accessible elements of sensitive customer, account, or transaction data.

In response to the determination that first computing system 122 is capable of generating the response to the messaging data (e.g., step 310; YES), first computing system 122 may perform any of the exemplary processes described herein to generate a response to the inquiry specified within the received messaging data based on selected portions of the locally maintained elements of sensitive customer, account, or transaction data (e.g., in step 312). First computing system 122 may transmit the generated response across communications network 120 to client device 102 (e.g., in step 314). As described herein, a programmatic interface associated with executed chatbot application 104, e.g., API 105, may receive the generated response, and executed chatbot application 104 may perform any of the exemplary processes described herein to generate and present interface elements representative of the received response within a corresponding digital interface, e.g., chatbot interface 182 of FIGS. 1A-1C and 2A-2C.

Referring back to FIG. 3, first computing system 122 may determine in step 316 whether executed chatbot application 104 elects to maintain a pendency of the established chatbot session, e.g., subsequent to or responsive to the presentation of the response within the chatbot interface 182. For example, and upon the presentation of response within the chatbot interface 182 by executed chatbot application 104, user 101 may provide additional input to client device 102 that requests a termination of the established chatbot session. Responsive to the additional input, executed chatbot application 104 may generate a request to terminate the chatbot session (e.g., as established in step 302, above), and client device 102 may transmit the termination request across communications network 120 to first computing system 122. In some instances, and in response to the termination request, first computing system 122 may perform operations that terminate the secure, programmatic communications session with executed chatbot application 104 and as such, that terminate the established chatbot session.

If first computing system 122 were to determine that chatbot application 104 elected to terminate the established chatbot session (step 316; NO), exemplary process 300 may be complete in step 318. Alternatively, if first computing system 122 were to determine that chatbot application 104 elected to maintain the pendency of the established chatbot session (step 316; YES), exemplary process 300 may pass back to step 304, and first computing system 122 may perform operations that await a receipt of additional messaging data during the established chatbot session.

Referring back to step 310, first computing system 122 may determine that the provisioned products or services are inconsistent with the product or service identified within the one or more elements of messaging data and additionally, or alternatively, that the locally maintained elements of sensitive customer, account, or transaction data are inconsistent with the responsive data type or data class. Based on this determination, first computing system 122 may determine that it is incapable of responding to the inquiry specified messaging data (e.g., step 310; NO), and first computing system 122 may perform any of the exemplary processes described herein to identify an additional computing system that is capable of responding to the specified inquiry (e.g., in step 320).

By way of example, in step 324, first computing system may access one or more data records of a capability database (e.g., capability database 126B of FIGS. 1B and 2B), each of which include identification data that characterize a corresponding computing system (e.g., second computing system 152, third-party computing system 242, etc.) and a chatbot engine executed by the corresponding computing system (e.g., second chatbot engine 154, third-party chatbot engine 244, etc.). Further, and as described herein, the data record associated with each of the corresponding computing systems may also link the identification data to capability data that specifies products or services provided by the corresponding computing system and/or data types or classes available to the corresponding one of the executed chatbot engines.

Based on portions of the linked capability data, first computing system 122 may perform any of the exemplary processes described herein to identify the additional computing system capable of responding to the inquiry within the messaging data, and to extract all or a portion of the identification data associated with the additional computing system (e.g., also in step 320). Further, first computing system 122 may perform any of the exemplary processes described herein to establish an existence, or absence, of a relationship between first computing system 122 and the now-identified identified additional computing system (e.g., in step 322).

In one instance, first computing system 122 may perform any of the exemplary processes described herein to establish the existence of the relationship with the additional computing system (e.g., step 322; YES). As described herein, the established existence of the relationship may enable a chatbot engine executed by the additional computing system to establish a secure communications session with executed chatbot application 104 based on a prior authentication between executed chatbot application 104 and first computing system 122. The prior authentication between executed chatbot application 104 and first computing system 122 may also confirm that user 101 consented to an access of sensitive customer, account, or transaction data by first computing system 122, and in some instances, the existence of that relationship may imply that the chatbot engine executed by the additional computing system may rely on the provided consent to access similarly sensitive customer, account, or transaction data maintained locally at the additional computing system.

Responsive to the established relationship, first computing system 122 may perform any of the exemplary processes described herein generate a digital authentication token representative of that prior authentication and/or consent of user 101 (e.g., in step 324). For example, first computing system 122 may generate the digital authentication token based on an application of one or more token-generation algorithms or processes to input data that includes, but is not limited to, an identifier of client device 102 and/or executed chatbot application 104 (e.g., a network address of client device 102, such as an IP address, an identifier or address of a programmatic interface of executed chatbot application 104, etc.), a portion of the received messaging data (e.g., that characterizes the specified inquiry), and additionally, or alternatively, portions of generated linguistic element data and contextual information generated through the application of the NLP algorithms or techniques described herein. In some instances, the digital authentication token may be characterized by a structure specified by, or recognized by, the chatbot engine executed by the additional computing system and/or a programmatic interface of that executed chatbot engine, and examples of the digital authentication token include, but are not limited to, a cryptogram, a hash, random number, or other element of cryptographic data having a predetermined length or structure.

In some instances, first computing system 122 may perform operations that package the digital authentication token into a portion of an augmentation request, along with elements of baseline session data that identify and characterize the on-going chatbot session established between chatbot application 104 and first computing system 122 (e.g., in step 326). In some instances, the generated elements of baseline session data may include, but are not limited to: the unique alphanumeric identifier of the established chatbot session; information that uniquely identifies client device 102 and/or executed chatbot application 104 (e.g., a network address of client device 102, such as an IP address, an identifier or address of a programmatic interface of executed chatbot application 104, etc.); raw message data characterizing the inquiry within the messaging data; and additionally, or alternatively, portions of the linguistic element data and contextual information described herein. In some instances, first computing system 122 may transmit the augmentation request to the additional computing system across communications network 120 using any appropriate communications protocol (e.g., in step 328). The additional computing system can perform any of the exemplary processes described herein to verify the digital authentication token, and responsive to a successful verification, generate an appropriate response to the specified inquiry based on the locally accessible elements of sensitive customer, account, or transaction data, augment the established chatbot session by establishing secure, programmatic communications session with executed chatbot application 104, and provision the generated response to client device 102 for presentation on chatbot interface 182 during the augmented chatbot session.

Exemplary process 300 may then pass back to step 316, and first computing system 122 may perform operations that determine whether executed chatbot application 104 elects to maintain the established chatbot session e.g., subsequent to the provisioning of the response generated by additional computing system within chatbot interface 182.

In some exemplary embodiments, described herein in reference to steps 328-328, first computing system 122 and the additional computing system may perform operations that augment an established chatbot session based on, among other things, a determined existence of a relationship between first computing system 122 and the additional computing system, and a prior authentication of the identity of user 101 by first computing system 122 during the established chatbot session. In other instances, and referring back to step 322, first computing system 122 may perform any of the exemplary processes described herein determine that the additional computing system is unrelated to the financial institution that operates first computing system 122 (e.g., step 322; NO). Based on the determined absence of the relationship, first computing system 122 and the additional computing system may be unable to rely on the prior authentication of user 101, or the prior grant of consent by user 101, to augment the established chatbot session. In other exemplary embodiments, and in view of the determined absence of the relationship, first computing system 122 and the additional computing system may perform operations that augment the established chatbot session based on, among other things, data indicative of a successful outcome of one or more token-based authentication and consent processes, such as, but not limited to, the OAuth protocol described herein.

For instance, in step 324, first computing system 122 may perform any of the exemplary processes described herein to obtain consent data indicative of a successful outcome of one or more token-based authentication and consent processes, e.g., the OAuth protocol implemented in conjunction with the additional computing system and client device 102 (e.g., in step 330). The consent data may, for example, include a digital token, cryptogram, hash value, or other element of cryptographic data, such as an OAuth token indicative of a successful authentication of the identity of user 101, and of an access permission granted by user 101, during the implemented OAuth protocol. For example, in step 330, first computing system 122 may extract the consent data associated with the additional computing system, e.g., the OAuth token, from one or more tangible, non-transitory memories. In other instances, also in step 330, first computing system 122 may perform operations that, in conjunction with application programs executed by the additional computing system and client device 102, initiate the one or more token-based authentication and consent processes, e.g., the OAuth protocol, and in response to a successful outcome, that provision the consent data, e.g., the OAuth token, to first computing system 122.

In some instances, first computing system 122 may perform operations that package the consent data, e.g., the OAuth token, into a portion of an augmentation request, along with elements of baseline session data that identify and characterize the established chatbot session (e.g., in step 332), and that transmit the augmentation request to the additional computing system across communications network 120 using any appropriate communications protocol (e.g., in step 334). The additional computing system can perform any of the exemplary processes described herein to verify the consent data (e.g., the OAuth token), and responsive to a successful verification, generate an appropriate response to the specified inquiry based on the locally accessible elements of sensitive customer, account, or transaction data, augment the established chatbot session by establishing secure, programmatic communications session with executed chatbot application 104, and provision the generated response to client device 102 for presentation on chatbot interface 182 during the augmented chatbot session.

Exemplary process 300 may then pass back to step 316, and first computing system 122 may perform operations that determine whether executed chatbot application 104 elects to maintain the established chatbot session e.g., subsequent to the provisioning of the response generated by additional computing system within chatbot interface 182.

Figure 4:
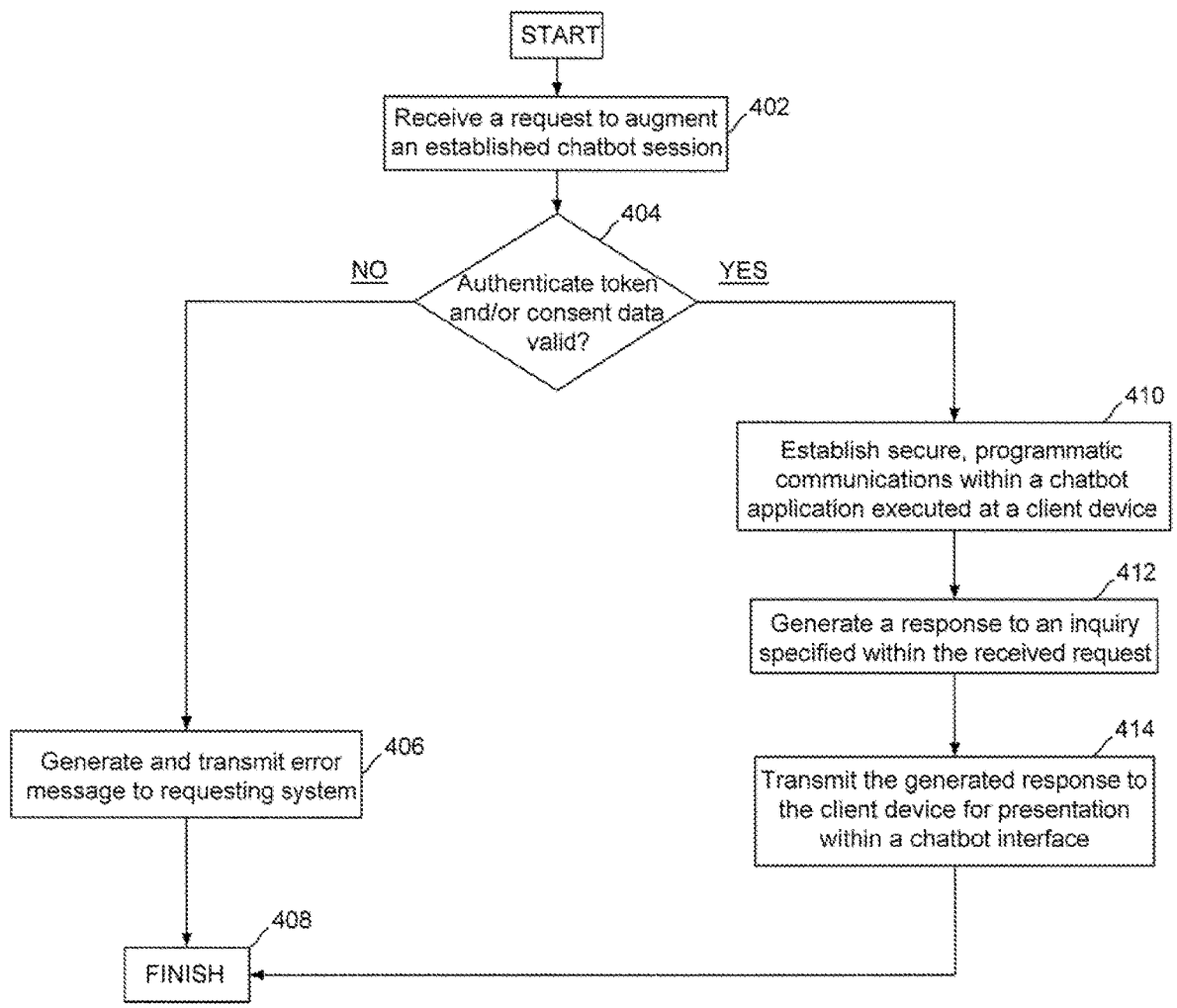

FIG. 4 is a flowchart of an exemplary process 400 for dynamically and securely augmenting a programmatically generated chatbot session, in accordance with the disclosed embodiments. In some examples, a network-connected computing system, such as second computing system 152 of FIGS. 1A-1C or third-party computing system 242 of FIGS. 2A-2C, may perform one or more of the exemplary steps of process 400, which include, among other things, dynamically augmenting the established chatbot session based on secure, programmatic communications initiated with one or more application programs executed by an additional network-connected device, such as chatbot application 104 executed by client device 102.

Referring to FIG. 4, a programmatic interface of second computing system 152 (or third-party computing system 242) may receive an augmentation request generated by an additional computing system, such as, but not limited to, first computing system 122 of FIGS. 1A-1C and 2A-2C (e.g., in step 402). By way of example, the received augmentation request may include one or more elements of authentication or consent data, such as, but not limited to, the authentication token or the OAuth token described herein, along with elements of baseline session data that identify and characterize an chatbot session between a chatbot engine executed by first computing system 122 (e.g., first chatbot engine 124) and a chatbot application executed by client device 102 (e.g., chatbot application 104), and an inquiry specified within messaging data generated during that established chatbot session.

As described herein, the authentication token may be indicative of a successful prior authentication of user 101 by first computing system 122 during the established chatbot session (e.g., based on an existing relationship between first computing system 122 and second computing system 152). Examples of the authentication token include, but are not limited to, a cryptogram, a hash, random number, or other element of cryptographic data having a predetermined length or structure (e.g., a number of leading or trailing zeroes, etc.). Further, the one or more elements of authentication or consent data may be indicative of a successful outcome of the one or more token-based authentication and consent protocols described herein (e.g., based on a determined lack of a relationship between first computing system 122 and third-party computing system 242). For example, the OAuth token may indicate and confirm a successful outcome of a collective implementation of the OAuth protocol described herein by the application programs executed by first computing system 122, third-party computing system 242, and client device 102.

In some instances, second computing system 152 (or third-party computing system 242) may perform any of the exemplary processes described herein to validate the elements of authentication or consent data included within the received augmentation request (e.g., in step 404). For example, in step 404, second computing system 152 (or third-party computing system 242) may validate the authentication token based on a comparison with a local authentication token extracted from one or more tangible, non-transitory memories, or alternatively, computed using any of the exemplary processes described herein. In other examples, and as described herein, second computing system 152 (or third-party computing system 242) may validate the OAuth token based on a comparison with a locally maintained copy of the OAuth token, e.g., as stored locally within the one or more tangible, non-transitory memories.

If second computing system 152 (or third-party computing system 242) were to determine an inconsistency between the received and locally extracted or computed copies of the authentication or consent data (e.g., the authentication token or the OAuth token), second computing system 152 (or third-party computing system 242) may decline to validate the authentication or consent data (e.g., step 404; NO). In some instances, second computing system 152 (or third-party computing system 242) may generate and transmit an error message indicative of the failed validation to first computing system 122 (e.g., in step 406), and exemplary process 400 may then be complete in step 408.

Alternatively, if second computing system 152 (or third-party computing system 242) were to establish a consistency between the received and locally extracted or computed copies of the authentication or consent data (e.g., the authentication token or the OAuth token), second computing system 152 (or third-party computing system 242) may validate the received authentication or consent data (e.g., step 404; YES). Responsive to the successful validation of the authentication or consent data, second computing system 152 (or third-party computing system 242) may perform operations that establish a handshake with a communications interface of client device 102, which facilitates secure, programmatic communications and exchanges of data between second computing system 152 (or third-party computing system 242) and chatbot application 104 executed by client device 102 (e.g., in step 410). Further, in step 410 second computing system 152 (or third-party computing system 242) may also perform operations that store now-validated the augmentation request, including the now-validated authentication or consent data and the baseline session data, within the one or more tangible, non-transitory memories.

Second computing system 152 (or third-party computing system 242) may also extract the baseline session data from the received augmentation request, and may perform any of the exemplary processes described herein to generate a response to the inquiry specified within the baseline session data (e.g., in step 412). As described herein, the baseline session data may include a unique identifier of user 101 (e.g., a login credential, etc.), client device 102 (e.g., a network address, such as an IP address, etc.), or chatbot application 104 (e.g., an address of a corresponding programmatic interface, etc.) associated with established chatbot session. Further, as also described herein, baseline session data 144 may also associate each of the unique identifiers with additional information that characterizes the inquiry specified within the additional messaging data, such as, but not limited to, one or more discrete linguistic elements that correspond to the specified inquiry and contextual data establishing a context or meaning of the specified inquiry.

For example, in step 412, second computing system 152 (or third-party computing system 242) may parse the baseline session data to extract one or more of the unique identifiers of user 101, client device 102, and/or executed chatbot application 104, and all or a portion of the contextual information, which characterizes the inquiry included within the message data, the product or service specified by that inquiry, and further, types or classes of data (e.g., responsive data types or classes) that would facilitate a generation of a response to the inquiry. In some instances, second computing system 152 (or third-party computing system 242) may access one or more elements of the sensitive customer, account, or transaction data that are consistent with the extracted identifiers and the extracted portion of the contextual data, and perform any of the exemplary processes described herein to generate a response to the specified inquiry that includes, or is based on, the accessed elements of the sensitive customer, account, or transaction data (e.g., also in step 412).

Second computing system 152 (or third-party computing system 242) may perform any of the exemplary processes described herein to transmit the generated response across communications network 120 to client device 102 (e.g., in step 414). As described herein, a programmatic interface of client device 102 (e.g., API 10-5 of executed chatbot application 104) may receive the generated response, and perform any of the exemplary processes described herein to present one or more interface elements representative of the generated response within a corresponding portion of chatbot interface 182 during the now-augmented chatbot engine. Exemplary process 400 is then complete in step 416.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, chatbot application 104, chatbot engines 124, 154, and 224, APIs 105, 128, 156, and 246, session management module 130, NLP engine 132, predictive engine 134, augmentation module 136, security modules 160 and 250, response generation modules 164 and 252, messaging modules 168 and 258, session augmentation module 116, and chatbot interface module 118, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:
1. An apparatus, comprising:
a communications unit;
a memory storing instructions; and;

at least one processor coupled to the communications unit and to the memory, the at least one processor being configured to execute the instructions to:
receive, via the communications unit, a first signal from a device that includes messaging data, the first signal being received during a first communication session established between the device and a first executed application program;
obtain contextual information identifying a first type of data that is responsive to an inquiry associated with the messaging data;
based on an established inconsistency between the first data type and a second type of data maintained within the memory, and based on an established consistency between the first data type and a third type of data maintained at an additional apparatus, determine that the additional apparatus is configured to respond to the inquiry; and
transmit, via the communications unit, a second signal to the additional apparatus that includes a digital token and at least a portion of the messaging data,
wherein the second signal comprises information that causes a second application program executed by the additional apparatus to validate the digital token, establish a second communication session between the device and the executed first and second application programs based on the portion of the messaging data, and perform operations that generate a response to the inquiry and that transmit the response to the device during the second communications session.

2. The apparatus of claim 1, wherein:
a third application program executed by the device generates the messaging data;
the first communications session is established between the first executed application program and the third executed application program; and
the second communications session is established between the first executed application program, the second executed application program, and the third executed application program.

3. The apparatus of claim 2, wherein:
the messaging data comprises (i) identification data that identifies at least one of the device or the third application program and (ii) query data that specifies the inquiry.

4. The apparatus of claim 1, wherein
the at least one processor is further configured to load, from the memory, capability data that characterizes the second data type and the third data type, the third data type being maintained by the additional apparatus within an additional memory.

5. The apparatus of claim 4, wherein the at least one processor is further configured to:
establish the inconsistency between the first data type and the second data type, and establish the consistency between the first data type and the third data type; and
based on the established inconsistency between the first and second data types, and on the established consistency between the first and third data types, determine that the additional computing system is configured to generate the response to the inquiry based on one or more elements of response data maintained within the additional memory, the response data being characterized by the third data type.

6. The apparatus of claim 4, wherein the at least one processor is further configured to:

establish a consistency between the first data type and the second data type; and
based on the established consistency between the first and second data types, load, from the memory, elements of response data that are consistent with the second data type and responsive to the inquiry; and
transmit, via the communications unit, a third signal to the device that includes one or more of the elements of response data, the third signal comprising information that causes the third executed application program to present at least a portion of the one or more elements of response data within a digital interface associated with the first communications session.

7. The apparatus of claim 3, wherein:
the at least processor is further configured to identify a relationship between the apparatus and the additional apparatus based on one or more elements of relationship data maintained within the memory;
the digital token comprises an authentication token indicative of a prior authentication of at least one of the device or a user of the device during the first communications session; and
the at least one processor is further configured to, in response to the identified relationship, generate the authentication token based on at least a portion of the identification data or the query data.

8. The apparatus of claim 3, wherein the at least processor is further configured to:
determine that the additional apparatus is unrelated to the apparatus based on one or more elements of relationship data maintained within the memory;
generate and transmit, via the communications unit, a third signal to the additional apparatus, the third signal comprising a portion of at least one of the identification data or the query data, and the third signal further comprising additional information that causes the additional apparatus to perform operations that authenticate at least one of the device or a user of the device, and that generate the digital token in response to the authentication; and
receive, via the communications unit, a fourth signal that includes the digital token, the digital token comprising an OAuth token indicative of the authentication of the device or the user.

9. The apparatus of claim 1, wherein the second signal comprises additional information that causes the executed second application to validate the digital token, establish the second communication session based on the validated digital token, and generate and transmit interface data identifying the second communications session to the device.

10. The apparatus of claim 1, wherein:
the messaging data comprises (i) identification data that identifies at least one of the device or a third application program executed by the device and (ii) query data that specifies the inquiry;
the second signal further comprises a portion of the identification data or the query data; and
the second signal further comprises additional information that causes the executed second application to load, from an additional memory, elements of response data consistent with the portion of the identification data or the query data, generate the response to the inquiry based on the elements of response data, and transmit the response to the device, the device being configured to present at least a portion of the response within digital interface associated with the first communications session.

11. The apparatus of claim 1, wherein:
the at least one processor is further configured to establish the second communication session based on the validation of the digital token, and to generate the response based on the portion of the messaging data; and
the device is further configured to present at least a portion of the response within a digital interface associated with the first communications session.

12. The apparatus of claim 1, wherein:
the inquiry comprises a natural language query associated with at least one of a product or a service; and
the at least one processor is further configured to generate at least a portion of the contextual information based on an application of natural language processing to the messaging data.

13. A computer-implemented method, comprising:
receiving, using at least one processor, a first signal from a device that includes messaging data, the first signal being received during a communication session established between the device and a first executed application program;
obtaining, using the at least one processor, contextual information identifying a first type of data that is responsive to an inquiry associated with the message data;
based on an established inconsistency between the first data type and a second type of data maintained within a memory coupled to the at least one processor, and based on an established consistency between the first data type and a third type of data maintained at an additional apparatus, determining, using the at least one processor that the additional apparatus is configured to respond to the inquiry; and
using the at least one processor, transmitting a second signal to the additional apparatus that includes a digital token and at least a portion of the messaging data,
wherein the second signal comprises information that causes a second application program executed by the additional apparatus to validate the digital token, establish a second communication session between the device and the executed first and second application programs based on the portion of the messaging data, and perform operations that generate a response to the inquiry and that transmit the response to the device during the second communications session.

14. The computer-implemented method of claim 13, wherein:
a third application program executed by the device generates the messaging data;
the first communications session is established between the first executed application program and the third executed application program;
the second communications session is established between the first executed application program, the second executed application program, and the third executed application program; and
the messaging data comprises (i) identification data that identifies at least one of the device or the third application program and (ii) query data that specifies the inquiry.

15. The computer-implemented method of claim 13, further comprising:
obtaining capability data that characterizes the second data type maintained within the memory coupled to the at least one processor and the third data type, the third data type being maintained by the additional apparatus within an additional memory.

16. The computer-implemented method of claim 15, further comprising:
establishing the inconsistency between the first data type and the second data type, and establish the consistency between the first data type and the third data type; and
based on the established inconsistency between the first and second data types, and on the established consistency between the first and third data types, determining that the additional apparatus is configured to generate the response to the inquiry based on one or more elements of response data maintained within the additional memory, the response data being characterized by the third data type.

17. The computer-implemented method of claim 15, further comprising:
establishing a consistency between the first data type and the second data type; and
based on the established consistency between the first and second data types, obtaining elements of response data that are consistent with the second data type and responsive to the inquiry; and
transmitting a third signal to the device that includes one or more of the elements of response data, the third signal comprising information that causes the third executed application program to present at least a portion of the one or more elements of response data within a digital interface associated with the first communications session.

18. The computer-implemented method of claim 14, wherein:
the method further comprises identifying a relationship between the apparatus and the additional apparatus based on one or more elements of relationship data;
the digital token comprises an authentication token indicative of a prior authentication of at least one of the device or a user of the device during the first communications session; and
the method further comprises, in response to the identified relationship, generating the authentication token based on at least a portion of the identification data or the query data.

19. The computer-implemented method of claim 14, further comprising:
determining that the additional apparatus is unrelated to the apparatus based on one or more elements of relationship data maintained within the memory,
generating and transmitting a third signal to the additional apparatus, the third signal comprising a portion of at least one of the identification data or the query data, and the third signal further comprising additional information that causes the additional apparatus to perform operations that authenticate at least one of the device or a user of the device, and that generate the digital token in response to the authentication; and
receive a fourth signal that includes the digital token, the digital token comprising an OAuth token indicative of the authentication of the device or the user.

20. An apparatus, comprising:
a communications unit;
a memory storing instructions; and;
at least one processor coupled to the communications unit and to the memory, the at least one processor being configured to execute the instructions to:
receive, from a computing system via the communications unit, a first signal that includes session data and a digital token, the session data characterizing a first communications session between a device and a first executed application program;

obtain contextual information that characterizes an inquiry associated with session data, the contextual information identifying a first type of data that is responsive to the inquiry, the first data type being inconsistent with a second type of data maintained at the computing system and consistent with a third type of data maintained within the memory;

perform operations that validate the digital token;

based on the validation of the digital token, establish a second communication session between the device, the first executed application program, and a second application program executed by the apparatus, the second communications session being established in accordance with a portion of the session data; and generate and transmit, via the communications unit, a second signal that includes interface data identifying the second communications session, the second signal comprising information that causes the device to present the interface data within a portion of a digital interface associated with the first communications session.

21. The apparatus of claim 20, wherein:

the session data comprises (i) identification data that identifies at least one of the device or a third application program executed by the device and (ii) query data that specifies the inquiry;

load, from the memory, elements of response data that are consistent with the first data type and responsive to the inquiry, the response data elements being associated with at least one of the identification data or the query data; and generate a response to the inquiry and transmit, via the communications unit, a third signal to the device that includes the response, the response comprising one or more of the elements of response data, and the third signal comprising information that causes the third executed application program to present at least a portion of the response within the digital interface associated with the first communications session.

\* \* \* \* \*